(12) United States Patent
Keller et al.

(10) Patent No.: US 8,337,191 B2
(45) Date of Patent: Dec. 25, 2012

(54) DIES FOR MAKING EXTRUDED SYNTHETIC WOOD AND METHODS RELATING THERETO

(75) Inventors: Brian David Keller, Oregon, WI (US);
David Frank Dostal, Cambridge, WI (US); Alfred Bruce England, Cincinnati, OH (US)

(73) Assignee: Strandex Corporation, Madison, WI (US)

(*) Notice: Subject to any disclaimer, the term of this patent is extended or adjusted under 35 U.S.C. 154(b) by 252 days.

(21) Appl. No.: 12/569,629

(22) Filed: Sep. 29, 2009

(65) Prior Publication Data

US 2010/0015267 A1 Jan. 21, 2010

Related U.S. Application Data

(63) Continuation-in-part of application No. 11/856,431, filed on Sep. 17, 2007.

(60) Provisional application No. 60/844,827, filed on Sep. 15, 2006, provisional application No. 61/194,626, filed on Sep. 29, 2008.

(51) Int. Cl.
*B29C 47/30* (2006.01)
*B29C 47/00* (2006.01)
*B29C 47/92* (2006.01)
*B29C 47/14* (2006.01)

(52) U.S. Cl. .... 425/461; 264/46.1; 425/4 C; 425/817 C; 425/192 R; 425/198

(58) Field of Classification Search .................. 425/4 C, 425/817 C, 192 R, 197, 198, 376.1, 461; 264/46.1
See application file for complete search history.

(56) References Cited

U.S. PATENT DOCUMENTS 3,406,435 A * 10/1968 Hans-Joachim Dietzsch . 425/96
(Continued)

FOREIGN PATENT DOCUMENTS
DE 10006162 A1 8/2001
(Continued)

OTHER PUBLICATIONS

Lutskii, M. S., et al, Improvement of Equipment with a View to Raising Quality of Extruded Rubber Profiles, Jan. 1, 1990, Int'l Polymer Science & Tech., Rapra Tech., Shrewabury, GB, pp. T10-T12, XP000208739.

(Continued)

*Primary Examiner* — Joseph Del Sole
*Assistant Examiner* — Nahida Sultana
(74) *Attorney, Agent, or Firm* — Charles S. Sara, Esq.; Daniel A. Blasiole; Dewitt Ross & Stevens, S.C.

(57) ABSTRACT

The present invention is directed to extrusion dies for making extruded synthetic wood and methods relating thereto. The dies include adapter dies, transition dies, stranding dies, and molding dies. The adapter dies include a channel with a restricted cross-sectional area. The stranding dies include a plurality of non-uniform channels that differ in length, cross-sectional area, cross-sectional shape, or combinations thereof. The transition dies are coordinately configured with the stranding die to adjust the flow rate of the extrudate. Particular configurations of dies upstream of the molding die allow for higher compression ratios in the molding die than previously feasible. Each of the dies described herein may be used individually with standard dies known in the art. Alternatively, the dies may be used in combination to form integrated units. The dies described herein allow for making stronger, more consistent synthetic wood at greater output rates than previously possible.

47 Claims, 20 Drawing Sheets

U.S. PATENT DOCUMENTS

| | | | |
|---|---|---|---|
| 3,573,152 A * | 3/1971 | Wiley et al. | 428/114 |
| 3,811,659 A | 5/1974 | Taylor et al. | |
| 3,899,276 A * | 8/1975 | Sokolow | 425/380 |
| 3,993,721 A | 11/1976 | Soda et al. | |
| 4,056,597 A * | 11/1977 | Cooper | 264/169 |
| 4,380,424 A * | 4/1983 | Skoch et al. | 425/331 |
| 4,828,770 A * | 5/1989 | Fabian et al. | 264/40.3 |
| 5,516,472 A | 5/1996 | Laver | |
| 5,843,490 A * | 12/1998 | Horiba et al. | 425/380 |
| 5,919,509 A * | 7/1999 | Cremers et al. | 426/516 |
| 6,039,908 A * | 3/2000 | Brew et al. | 264/177.12 |
| 6,117,924 A | 9/2000 | Brandt | |
| 6,344,504 B1 | 2/2002 | Zehner | |
| 6,444,153 B1 * | 9/2002 | Shah et al. | 264/211.21 |
| 6,558,151 B1 * | 5/2003 | Kragle | 425/463 |
| 2002/0185765 A1 * | 12/2002 | Dorninger et al. | 264/39 |
| 2003/0209825 A1 * | 11/2003 | Timmons et al. | 264/40.7 |
| 2004/0124556 A1 * | 7/2004 | Hawley | 264/136 |
| 2006/0105072 A1 | 5/2006 | Hughes | |
| 2006/0113692 A1 * | 6/2006 | Hannen | 264/3.3 |

FOREIGN PATENT DOCUMENTS

| | | |
|---|---|---|
| EP | 1172404 A1 | 1/2002 |
| JP | 55 032647 A | 3/1980 |
| SU | 1518986 A1 * | 4/1992 |
| WO | WO2005/044536 A2 | 5/2005 |
| WO | WO 2007/015763 A1 | 2/2007 |
| WO | WO 2008/034127 A1 | 3/2008 |

OTHER PUBLICATIONS

Khettry, A., et al., "Real-time Analysis of Ethylene Vinyl Acetate Random Copolymers Using Near Infrared Spectroscopy During Extrusion," Polymer Engineering & Science, Brookfield Center, US, vol. 36, No. 9, May 15, 1996, pp. 1232-1243, XP000594994.

* cited by examiner

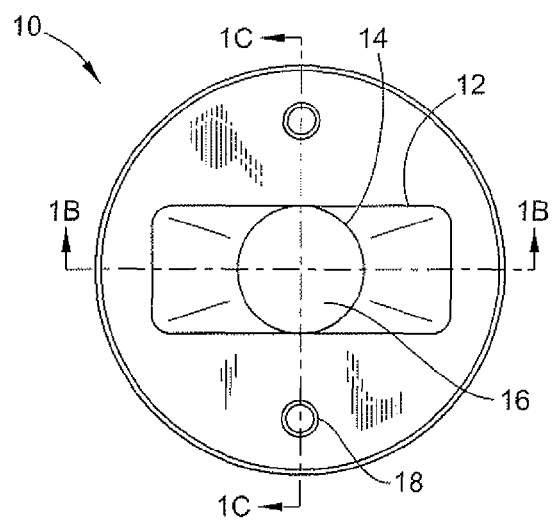
FIG. 1A
PRIOR ART
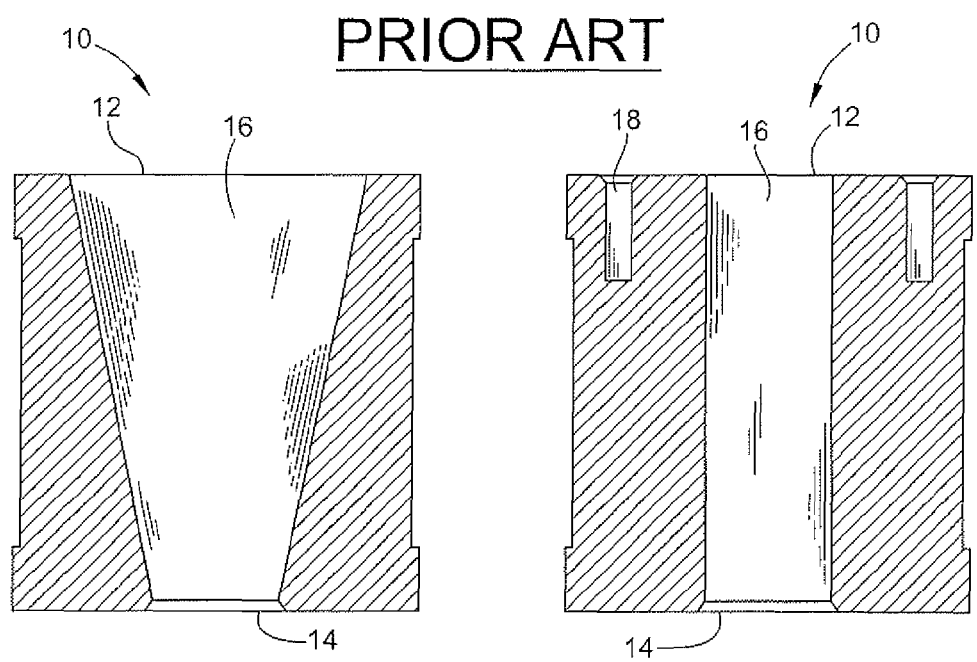
FIG. 1B
PRIOR ART
FIG. 1C
PRIOR ART

FIG. 7

| segment | width | height | Manifold flow rate | Manifold ΔP | a | b | Stranding Channels length | Stranding Channels ΔP | Stranding Channels flow rate | Total ΔP |
|---|---|---|---|---|---|---|---|---|---|---|
| 1 | 1.5667 | 1.150 | 0.1787 | 13.297 | 0.218886 | 0.686103 | 1.500 | 1556.28 | 0.0018 | 1569.58 |
| 2 | 1.5667 | 1.053 | 0.1608 | 27.482 | 0.22232 | 0.693427 | 1.472 | 1527.23 | 0.0018 | 1554.71 |
| 3 | 1.5667 | 0.956 | 0.1429 | 42.760 | 0.227352 | 0.703927 | 1.444 | 1498.18 | 0.0018 | 1540.94 |
| 4 | 1.5667 | 0.859 | 0.1251 | 59.415 | 0.234999 | 0.717241 | 1.416 | 1469.13 | 0.0018 | 1528.54 |
| 5 | 1.5667 | 0.762 | 0.1072 | 77.843 | 0.245961 | 0.733134 | 1.388 | 1440.08 | 0.0018 | 1517.92 |
| 6 | 1.5667 | 0.665 | 0.0893 | 98.609 | 0.260516 | 0.751686 | 1.360 | 1411.03 | 0.0018 | 1509.64 |
| 7 | 1.5667 | 0.567 | 0.0715 | 122.561 | 0.278595 | 0.773363 | 1.332 | 1381.98 | 0.0018 | 1504.54 |
| 8 | 1.5667 | 0.470 | 0.0536 | 151.051 | 0.300027 | 0.798969 | 1.304 | 1352.93 | 0.0018 | 1503.98 |
| 9 | 1.5667 | 0.373 | 0.0357 | 186.412 | 0.324968 | 0.829488 | 1.276 | 1323.87 | 0.0018 | 1510.29 |
| 10 | 1.5667 | 0.276 | 0.0179 | 233.031 | 0.354503 | 0.865809 | 1.248 | 1294.82 | 0.0018 | 1527.86 |

FIG. 8

| segment | width | height | Manifold flow rate | Manifold ΔP | a | b | Stranding Channels length | Stranding Channels ΔP | Stranding Channels flow rate | Total ΔP |
|---|---|---|---|---|---|---|---|---|---|---|
| 1 | 1.5667 | 1.150 | 0.1787 | 13.297 | 0.218886 | 0.686103 | 1.500 | 1556.28 | 0.0018 | 1569.58 |
| 2 | 1.5667 | 1.053 | 0.1608 | 27.385 | 0.222029 | 0.692781 | 1.500 | 1556.28 | 0.0018 | 1583.66 |
| 3 | 1.5667 | 0.956 | 0.1429 | 42.427 | 0.226477 | 0.702211 | 1.500 | 1556.28 | 0.0018 | 1598.71 |
| 4 | 1.5667 | 0.859 | 0.1251 | 58.639 | 0.23306 | 0.714102 | 1.500 | 1556.28 | 0.0018 | 1614.92 |
| 5 | 1.5667 | 0.762 | 0.1072 | 76.312 | 0.242394 | 0.728231 | 1.500 | 1556.28 | 0.0018 | 1632.59 |
| 6 | 1.5667 | 0.665 | 0.0893 | 95.841 | 0.254788 | 0.744588 | 1.500 | 1556.28 | 0.0018 | 1652.12 |
| 7 | 1.5667 | 0.567 | 0.0715 | 117.775 | 0.270258 | 0.763443 | 1.500 | 1556.28 | 0.0018 | 1674.05 |
| 8 | 1.5667 | 0.470 | 0.0536 | 142.898 | 0.288664 | 0.785339 | 1.500 | 1556.28 | 0.0018 | 1699.18 |
| 9 | 1.5667 | 0.373 | 0.0357 | 172.359 | 0.309948 | 0.811017 | 1.500 | 1556.28 | 0.0018 | 1728.64 |
| 10 | 1.5667 | 0.276 | 0.0179 | 207.716 | 0.334491 | 0.841266 | 1.500 | 1556.28 | 0.0018 | 1763.99 |

FIG. 9

| segment | Manifold | | | | | | Stranding Channels | | | Total |
|---|---|---|---|---|---|---|---|---|---|---|
| | width | height | flow rate | ΔP | a | b | length | ΔP | flow rate | ΔP |
| 1 | 1.5667 | 0.950 | 0.1787 | 16.178 | 0.227729 | 0.704651 | 1.500 | 1556.28 | 0.0018 | 1572.46 |
| 2 | 1.5667 | 0.853 | 0.1608 | 33.939 | 0.235559 | 0.718124 | 1.472 | 1527.23 | 0.0018 | 1561.17 |
| 3 | 1.5667 | 0.756 | 0.1429 | 53.767 | 0.246733 | 0.73417 | 1.444 | 1498.18 | 0.0018 | 1551.95 |
| 4 | 1.5667 | 0.659 | 0.1251 | 76.373 | 0.261504 | 0.752893 | 1.416 | 1469.13 | 0.0018 | 1545.50 |
| 5 | 1.5667 | 0.562 | 0.1072 | 102.869 | 0.279788 | 0.774781 | 1.388 | 1440.08 | 0.0018 | 1542.95 |
| 6 | 1.5667 | 0.465 | 0.0893 | 135.129 | 0.301421 | 0.800653 | 1.360 | 1411.03 | 0.0018 | 1546.16 |
| 7 | 1.5667 | 0.367 | 0.0715 | 176.692 | 0.326594 | 0.831498 | 1.332 | 1381.98 | 0.0018 | 1558.67 |
| 8 | 1.5667 | 0.270 | 0.0536 | 235.488 | 0.356473 | 0.868188 | 1.304 | 1352.93 | 0.0018 | 1588.41 |
| 9 | 1.5667 | 0.173 | 0.0357 | 335.348 | 0.393981 | 0.911083 | 1.276 | 1323.87 | 0.0018 | 1659.22 |
| 10 | 1.5667 | 0.076 | 0.0179 | 619.287 | 0.444772 | 0.959516 | 1.248 | 1294.82 | 0.0018 | 1914.11 |

Orientation AA

| Specimen # | Width (in) | Height (in) | Maximum Load (lb) | Maximum Shear Stress (lb/in²) |
|---|---|---|---|---|
| MAPE 1 | 0.9715 | 2.0250 | 3547 | 1803 |
| MAPE 2 | 0.9760 | 2.0130 | 3602 | 1833 |
| MAPE 3 | 0.9760 | 2.0095 | 3421 | 1744 |
| MAPE 4 | 0.9745 | 2.0120 | 3384 | 1726 |
| MAPE 5 | 0.9730 | 2.0190 | 3402 | 1732 |
| MAPE 6 | 0.9745 | 2.0085 | 3518 | 1797 |
| MAPE 7 | 0.9730 | 2.0055 | 3489 | 1788 |
| MAPE 8 | 0.9730 | 2.0185 | 3555 | 1810 |
| MAPE 9 | 0.9625 | 2.0275 | 3495 | 1791 |
| MAPE 10 | 0.9620 | 2.0120 | 3639 | 1880 |
| | | | Average | 1790 |

FIG. 19A

Orientation BB

| Specimen # | Width (in) | Height (in) | Maximum Load (lb) | Maximum Shear Stress (lb/in²) |
|---|---|---|---|---|
| MAPE-P1 | 2.0230 | 1.6270 | 3485 | 1059 |
| MAPE-P2 | 2.0265 | 1.6263 | 2700 | 819 |
| MAPE-P3 | 2.0270 | 1.6205 | 3210 | 977 |
| MAPE-P4 | 2.0230 | 1.6140 | 2923 | 895 |
| MAPE-P5 | 2.0230 | 1.6190 | 3265 | 997 |
| MAPE-P6 | 2.0230 | 1.6170 | 3457 | 1057 |
| MAPE-P7 | 2.0150 | 1.6143 | 2686 | 826 |
| MAPE-P8 | 2.0220 | 1.6155 | 2948 | 902 |
| MAPE-P9 | 2.0245 | 1.7460 | 3178 | 899 |
| MAPE-P10 | 2.0230 | 1.7813 | 2959 | 821 |
| | | | Average | 925 |

FIG. 19B

| Conventional Stranding Apertures | | |
|---|---|---|
| Specimen # | MOE (lb/in$^2$) | MOR (lb/in$^2$) |
| 1 | 636674 | 3671 |
| 2 | 634989 | 3689 |
| 3 | 638517 | 3673 |
| 4 | 641384 | 3694 |
| 5 | 641101 | 3741 |
| 6 | 652057 | 3725 |
| 7 | 660121 | 3745 |
| 8 | 650815 | 3740 |
| 9 | 654706 | 3684 |
| 10 | 643850 | 3709 |
| Mean | 645421 | 3707 |
| Std. Dev. | 8471 | 29 |

FIG. 21A

| Modified Stranding Apertures | | |
|---|---|---|
| Specimen # | MOE (lb/in$^2$) | MOR (lb/in$^2$) |
| 1 | 673635 | 3796 |
| 2 | 670764 | 3739 |
| 3 | 679186 | 3787 |
| 4 | 691796 | 3746 |
| 5 | 690951 | 3789 |
| 6 | 679021 | 3882 |
| 7 | 683131 | 3870 |
| 8 | 667608 | 3796 |
| 9 | 673385 | 3835 |
| 10 | 673971 | 3827 |
| Mean | 678345 | 3807 |
| Std. Dev. | 8182 | 47 |

FIG. 21B

| Conventional Stranding Apertures | |
|---|---|
| Specimen # | Shear Strength ($lb/in^2$) |
| 1 | 759 |
| 2 | 814 |
| 3 | 805 |
| 4 | 720 |
| 5 | 754 |
| 6 | 727 |
| 7 | 801 |
| 8 | 811 |
| 9 | 772 |
| 10 | 809 |
| 11 | 810 |
| 12 | 813 |
| Mean | 783 |
| Std. Dev. | 35 |

FIG. 22A

| Modified Stranding Apertures | |
|---|---|
| Specimen # | Shear Strength ($lb/in^2$) |
| 1 | 867 |
| 2 | 850 |
| 3 | 847 |
| 4 | 857 |
| 5 | 850 |
| 6 | 849 |
| 7 | 864 |
| 8 | 873 |
| 9 | 881 |
| 10 | 857 |
| 11 | 898 |
| 12 | 865 |
| Mean | 863 |
| Std. Dev. | 15 |

FIG. 22B

DIES FOR MAKING EXTRUDED SYNTHETIC WOOD AND METHODS RELATING THERETO

REFERENCE TO RELATED APPLICATIONS

This application is a continuation-in-part of U.S. patent application Ser. No. 11/856,431, in the name of Keller et al., filed Sep. 17, 2007, which claims priority to U.S. Provisional Patent Application Ser. No. 60/844,827, filed Sep. 15, 2006. This application also claims priority to U.S. Provisional Patent Application Ser. No. 61/194,626, filed Sep. 29, 2008. All of the above-listed patent applications are incorporated herein by reference in their entirety.

FIELD OF THE INVENTION

The present invention generally relates to extruder die systems for manufacturing composite materials. The invention particularly relates to modified extruder dies to be incorporated into an extruder system that allow users to precisely control the mixing, flow, and forming of a composite by independently manipulating the system's interchangeable nested dies.

BACKGROUND

U.S. Pat. No. 5,516,472 (Laver), which is incorporated herein by reference in its entirety, discloses a cellulosic-plastic composite and a method of processing the composite into a finished product. The method disclosed in Laver consists of passing material through a die extruder system composed of a series of nested dies. Among the types of dies included in the system are an adapter die, a transition die, a stranding die, a molding die, and a setting die. Each type of die is a flat plate that contains a number of channels. The size, quantity, and shape of the channels are determined by each die's particular function.

The method of processing cellulosic plastic composites in Laver works well at moderate extrusion rates (approximately 600 lb/hr), with raw materials of uniform particle size and consistent quality (in terms of purity and the physical and chemical properties of the various raw materials), and for generating relatively small product sizes. However, when the extrusion rates increase beyond a moderate value, raw materials with non-uniform particle size or general lower quality are used, or the extruded product is increased beyond a minimal size, defects appear in the extruded end product. The defects include a rough surface, unevenly dispersed ingredients, and decreased strength.

SUMMARY OF THE INVENTION

The present invention is directed to a die extruder system for the manufacturing of cellulosic plastic composites. The system includes an adapter die, a transition die, a stranding die, a molding die, and a setting die. The present invention provides modified die designs, methods for using modified die designs, and methods for generating products with the modified die designs for use under a wider variety of conditions. Among the characteristics of the dies modified herein include the dies' thickness, and the quantity, orientation, shape, and cross-sectional area of their channels. Each improved type of modified die may be used with standard, non-modified dies. Alternatively, each improved die may be used with other improved, modified dies to form an integrated system. The particular combination of dies used in any particular application depends on the conditions and goals of the application. The invention allows users to build a die system using only the dies best suited to process a specific composite. More specifically, the present invention provides modified dies for use in a die extruder system with the capacity for a wider range of consistencies, purity levels, extrusion rates, and product sizes.

The role of each type of die and the parameters modified herein are described as follows.

The adapter die connects the die system to an extruder, the latter of which pushes the composite material through the die system. In serving as an interface between the extruder and the remaining die system, the adapter die controls the flow rate of the composite entering the die system. The modified adapter dies described herein contain one channel, which varies in its shape, cross-sectional area, and length (determined by the thickness of the die).

The transition die receives the composite material from the adapter die and re-shapes and otherwise prepares the composite material for delivery to a stranding die. Like the adapter die, the transition die also typically includes a single channel. The shape of the channel changes from the front of the die to its rear. The front of the transition die resembles the shape of the rear orifice of the adapter die, and the rear of the transition die resembles the shape of the final product. As described herein, the dimensions of the transition die channel can affect the properties of the material delivered to the stranding die, which affects the structural and aesthetic qualities of the final product.

The stranding die separates the material received from the transition die into individual strands. A stranding die contains a number of stranding channels arranged in a pattern that resembles the final form of the product. The stranding dies described herein vary in die thickness; stranding channel quantity, cross-sectional area, and shape; and the relative spacing of the stranding channels, characterized by the distance between each stranding channel's centerline.

The molding die compresses the stranded composite into a shape resembling its final form and facilitates inter-welding of the individual strands. This process requires that the cross-sectional area of the orifice at the entrance of the molding die be greater than the cross-sectional area of the orifice at the exit. The difference in the cross-sectional area of the orifice at the molding die's front and rear determines the amount of compression that the die imposes on the composite. Other parameters that affect the final product include the size of the orifice at the rear of the molding die, which determines the size of the final product, and the distance over which the compression occurs, i.e., the thickness of the die. The dies described herein allow greater variability of the above parameters of molding dies.

One version of a modified die described herein comprises an adapter die including a front orifice, a rear orifice, and a channel connecting the front orifice to the rear orifice, wherein the channel includes a restricted zone with a cross-sectional area less than a cross-sectional area of the rear orifice.

Another modified die described herein comprises a stranding die including a front perforated surface, a rear perforated surface, and a plurality of non-uniform channels extending from the front perforated surface to the rear perforated surface. The individual channels in the plurality of non-uniform channels may differ in length, cross-sectional area, cross-sectional shape, or combinations thereof. The plurality of non-uniform channels may be configured to adjust the flow of extrudate through the system.

Another modified die described herein comprises a transition die including a front orifice, a rear orifice, and a channel connecting the front orifice to the rear orifice and having an inner surface, wherein the channel includes a tapered zone that decreases in cross-sectional area from the front orifice to the rear orifice. The transition die may be integrated with the stranding die to adjust the flow of extrudate through the system.

Another modified die described herein comprises a molding die including a front orifice, a rear orifice, and a channel connecting the front orifice to the rear orifice, wherein the ratio of the cross-sectional area of the front orifice to the cross-sectional area of the rear orifice defines a compression ratio and the compression ratio is greater than about 1.5:1. The molding die may be integrated with the stranding die and/or the transition die to adjust the flow of extrudate through the system.

The present invention is also directed to a process for extruding a cellulosic plastic composite extrudate comprising sequentially passing the extrudate through an adapter die, a transition die, a stranding die, and a molding die, wherein one of the modified dies described herein may be used in the extrusion process.

The present invention is additionally directed to a method of measuring and adjusting extrudate flow rate in an extrusion system. The method comprises the steps of measuring initial extrudate flow rate in distinct portions of a cross-sectional profile of an extrusion die and generating a flow-rate map therefrom, wherein each portion of the cross-sectional profile is represented on the flow-rate map with a portion-specific initial flow rate; calculating an initial pressure drop value from each portion-specific initial flow rate represented on the flow-rate map; calculating changes in pressure drop values required to achieve desired flow rates for each portion of the cross-sectional profile; and adjusting the length and/or cross-sectional area of the stranding channels to obtain the changes in pressure drop values, wherein the desired flow rates in each portion of the cross-sectional profile are achieved. In other versions, a manifold located upstream of the stranding channels is coordinately adjusted with the length and/or cross-sectional area of the stranding channels to obtain the required changes in pressure drop values.

In yet other versions of the measuring and adjustment methods, the flow-rate map is bisected along a line to generate at least a first half and a second half, wherein the first half is symmetrical with the second half and each portion-specific flow rate in the first half has a corresponding portion-specific flow rate in the second half; and averaging the portion-specific flow rate in the first half with the corresponding portion-specific flow rate in the second half. The flow-rate map may be bisected along more than one line, including but not limited to two, three, or four lines.

Allowing users to choose the particular dies described herein in an extruder system offers a number of advantages.

One advantage offered by the present invention is that it broadens the range of composites that can be processed using extruder die systems. Extruder systems promote uniformity within an extruded product by imposing resistance on the composite's flow. In the method of Laver, this is accomplished by incorporating a stranding die within the extruder system. Stranding dies increase a system's resistance to composite flow by increasing the amount of wall shear exerted by the system on the composite. Therefore, resistance to composite flow is primarily dependent on the dimensions of the stranding channels in the stranding die. In situations where the composite being passed is of relatively low viscosity, or in applications which require increased composite flow rates, flexibility in the die system's level of resistance to composite flow is desirable. The resistance imparted by the stranding die is a function of the length and cross-sectional area of the stranding channels. Laver determinately specifies a stranding channel length of 1.5 inches. The single length described by Laver, however, limits the composite flow rates that the system can effectively process. The present invention improves Laver by providing stranding dies with stranding channels having varying lengths. This flexibility significantly broadens the range of composite flow rates and consistencies that the extruder systems have traditionally been able to successfully process. The present invention similarly provides stranding dies with stranding channels having varying cross-sectional area. Modifying the stranding channel cross-sectional area to alter the system's resistance to composite flow is advantageous when changing length is not feasible.

The present invention also provides for increasing the amount of recycled material that may be processed by providing means for increasing the heat exposed to an extrudate. Two types of recycled material that may be used in the extrusion process include post-consumer recycled plastic and post-manufacturing recycled plastic. Post-consumer recycled plastics typically contain contaminants such as similar plastics with higher melting points or incompatible plastics that are difficult to disperse in the composite. Post-manufacturing recycled plastics typically contain barrier layers or have different mixtures of plastics, as are found in multi layer films. The various plastics present in each of these recycled materials typically have different processing requirements. A composite containing either type of recycled plastic would require additional heat and mixing during the extrusion step of manufacture so that the final product would have the same degree of homogeneity seen in a composite manufactured from uniform virgin materials.

The amount of heat to which a composite extrudate is exposed is a function of temperature, time, and frictional heating, the latter of which results from the mixing and conveying of the composite by the extruder. To increase the heat exposure, at least one of these factors must be increased. Increasing the processing temperature is not preferred because it may lead to degradation of the cellulosic fibers during the extrusion process. Increasing the processing time requires either a slower processing rate (less material output per unit time) or a longer residence time (material stays in the extruder for a longer period of time at the same output per unit time). A slower processing rate is not preferred because it limits productivity. Thus, the preferred method of increasing heat exposure is by increasing residence time of the composite. This does not result in lower production rates and has the added benefit of increasing the amount of frictional heat added to the composite through an increase in mixing time.

Increasing residence time can be accomplished by restricting flow through the adapter die. However, restricting the flow only at this point will result in a small, high velocity stream of material flowing through the remaining die. The increased velocity increases the friction between the material at the periphery due to contact with the perimeter of the die cavity. This results in an imbalance of flow across the cross-sectional profile of the flow stream, with the center of the profile flowing faster than the edges. The imbalance in flow causes edge tearing, surface roughness, and/or distortion of the profile shape of the final extruded product. This invention overcomes this problem by balancing the material flow through a design process that integrates the design of the adapter die, the transition die, and the stranding die.

A further benefit of the present invention is that it provides for a wider variety of sizes of extruded products. Laver, as an example, describes the molding die as measuring approximately 1.5 inches from its inlet orifice to its outlet orifice, where the inlet orifice is similarly shaped to the transition die's outlet orifice, and outlet orifice is identically shaped to the product. As will be described herein, the length of the molding die is related to the strength and product size of the final product. The length of the molding die in Laver is limited because standard adapter, transition, and stranding dies impose restrictions on the size of products that can be generated without sacrificing strength. The present invention overcomes these restrictions by providing means for manufacturers to alter the length of the molding die and angle of composite flow while maintaining the strength of the final product. The result is that the amount of compression the molding die exposes on the composite and other characteristics can be maximized when generating larger products.

Yet another benefit of this invention is that it allows the manufacturer of an extruded profile to optimize one or more mechanical properties of the profile for its particular end use. The stranding die of Laver creates an array of flow streams emanating from the stranding die. This array of flow streams is compacted and the individual streams are fused together. This invention improves inter-strand adhesion in critical areas.

The modified dies provided herein address problems that were not recognized by the prior alt, including Laver.

The objects and advantages of the invention will appear more fully from the following detailed description of the preferred embodiment of the invention made in conjunction with the accompanying drawings.

BRIEF DESCRIPTION OF THE DRAWINGS

FIG. 1A depicts a front elevation view of a prior art adapter die according to U.S. Pat. No. 5,516,472 to Laver.

FIG. 1B depicts a cross-sectional view of the prior art adapter die shown in FIG. 1A taken along line 1B-1B.

FIG. 1C depicts a cross-sectional view of the prior art adapter die shown in FIG. 1A taken along line 1C-1C.

FIG. 7 is a table showing pressure drop calculations for a transition die and stranding die of the present invention with integrated manifold taper and stranding channel length.

FIG. 8 is a table showing pressure drop calculations for a transition die and stranding die of the prior art having stranding channels of equal length.

FIG. 9 is a table showing pressure drop calculations for a transition die and stranding die with non-integrated manifold taper and stranding channel length.

FIG. 19A is a table showing shear strength of deck board specimens tested along line A-A as shown in FIG. 18.

FIG. 19B is a table showing shear strength of deck board specimens tested along line B-B as shown in FIG. 18.

FIG. 21A is a table showing flexural properties of a deck board prepared according to the stranding design of FIG. 18.

FIG. 21B is a table showing flexural properties of a deck board prepared according to the stranding design of FIG. 20.

FIG. 22A is a table showing shear strength of a deck board prepared according to the stranding design of FIG. 18 and tested along line B-B.

FIG. 22B is a table showing shear strength of a deck board prepared according to the stranding design of FIG. 20 and tested along line B-B.

DETAILED DESCRIPTION OF THE INVENTION

Figure 2A:
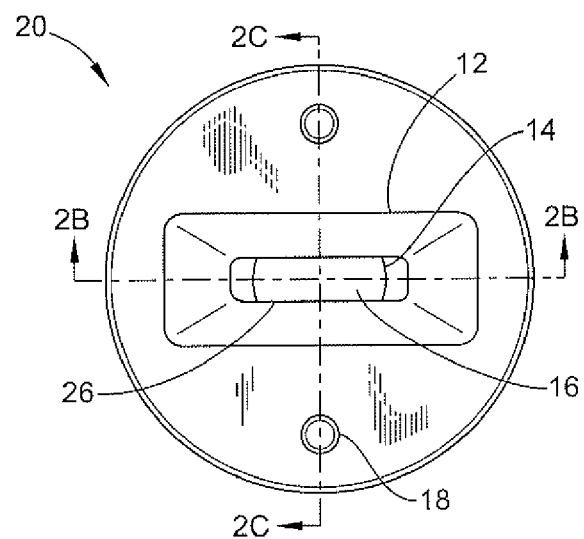
FIG. 2A depicts a front elevation view of an adapter die of the present invention.

One aspect of the present invention provides an extrusion system for increasing composite residence time by restricting flow through an adapter die.

FIGS. 1A, 1B, and 1C depict a typical prior art adapter die 10 following from Laver. The adapter die 10 includes a front orifice 12, a rear orifice 14, an adapter channel 16, and bolt holes 18. The front orifice 12 is defined to accommodate an extruder, such as extruder 32 illustrated in FIG. 3, which feeds composite material through the front orifice 12 into the adapter channel 16 of the adapter die 10. The rear orifice 14 is defined to feed composite material passing through the adapter channel 16 of the adapter die 10 to a transition die. The rear orifices 14 of prior art adapter dies are generally circular in shape and range from 50 mm to 300 mm in diameter. Prior art adapter dies typically serve only to connect the extruder to the remaining dies of the die system. As such, the adapter channels 16 are defined to evenly and gradually change the cross-sectional area from that of the front orifice 12 to that of the rear orifice 14. This is shown in FIGS. 1B and 1C, wherein the adapter die evenly and consistently decreases the cross-sectional area of the adapter channel 16 so that it is reduced from that of the front orifice 12 to that of the rear orifice 14. The adapter channel 16 is not reduced to a cross-sectional area less than that of the rear orifice. The bolt holes 18 are configured and positioned on the adapter die 10 to secure the adapter die 10 to the extruder.

Figures 2B, 2C:
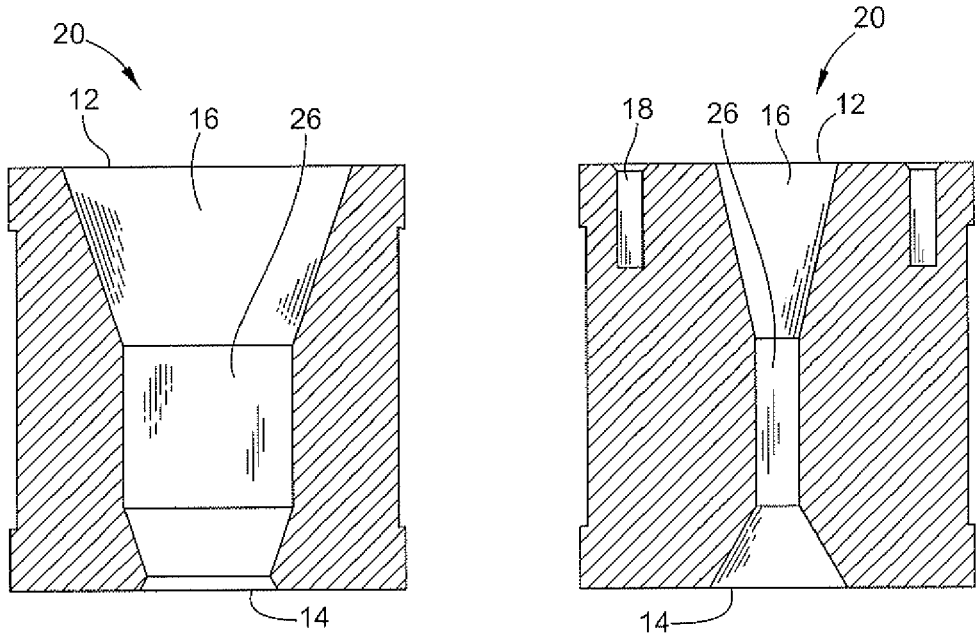
FIG. 2B depicts a cross-sectional view of the adapter die shown in FIG. 2A taken along line 2B-2B.
FIG. 2C depicts a cross-sectional view of the adapter die shown in FIG. 2A taken along line 2C-2C.

FIGS. 2A, 2B, and 2C depict an adapter die 20 of the present invention. Like the prior art adapter die 10, the adapter die 20 of the present invention includes a front orifice 12, a rear orifice 14, an adapter channel 16, and bolt holes 18. However, rather than evenly changing the cross-sectional area from that of the front orifice 12 to that of the rear orifice 14, the adapter channel 16 of the adapter die 20 of the present invention contains a restricted zone 26. The restricted zone 26 is a portion of the adapter channel 16 wherein the cross-sectional area is less than that of the rear orifice 14. In one version of the modified adapter die, the cross-sectional area of the rear orifice 14 is about 1257 $mm^2$, and the cross-sectional area of the restricted zone 26 ranges from about 175 $mm^2$ to about 900 $mm^2$ and may be about 645 $mm^2$. Adapter dies 20 having restricted zones 26 with various cross-sectional areas may be used depending on the degree of restriction desired. The ratios of the cross-sectional area of the rear orifice 14 to the cross-sectional area of the restricted zone 26 may be equal to or greater than about 1:1, 1.01:1, 1.05:1, 1.1:1, 1.2:1, 1.5:1, 2:1, 7:1, or 10:1. Acceptable ratio ranges include about 1.1 to about 10:1 and are preferably about 1.5:1 to about 8:1. The most preferred ratio varies according to the formulation of the composite, the resin used, and the amount of recycled material.

Figure 3:
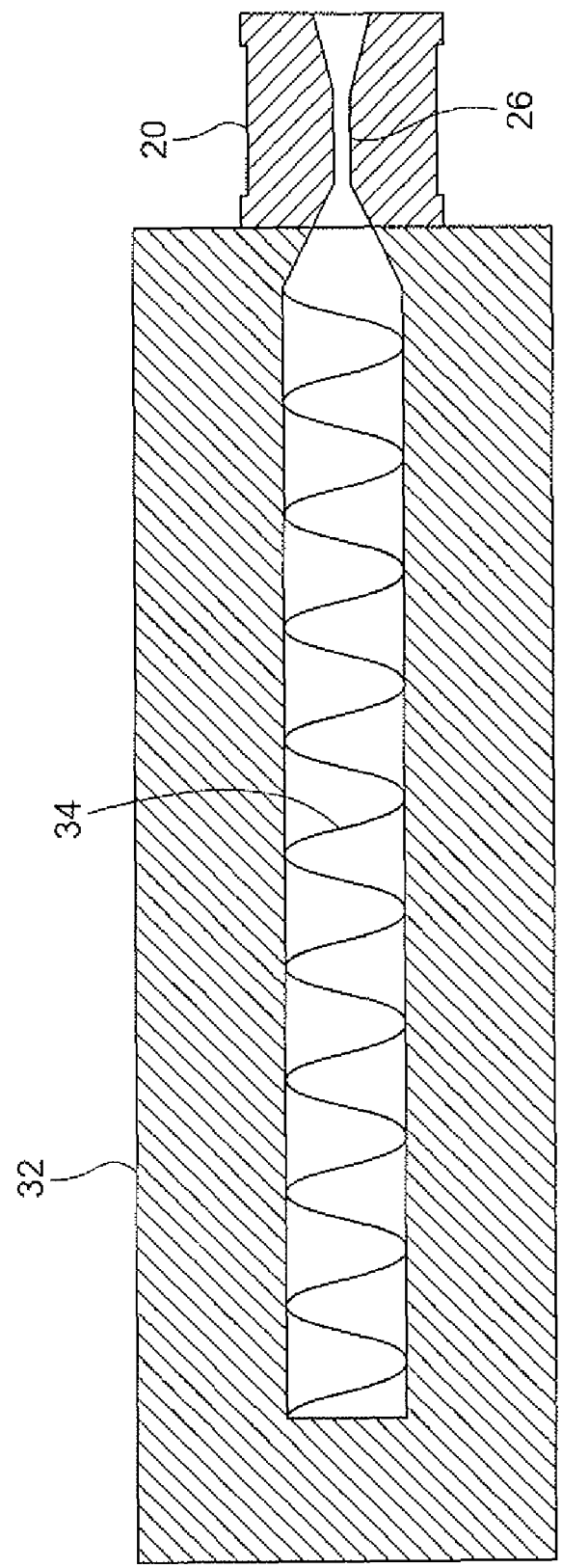
FIG. 3 depicts a cross-sectional side elevation view of an extruder and an adapter die of the present invention.

Incorporating a restricted zone 26 into the adapter die 20 increases the heat exposed to the extrudate during processing. This is a function of the increase in pressure required to force material through the restricted zone 26 of the adapter die 20 and the resulting effects. Cellulose-plastic composites are compressible when molten. The increased pressure compresses the cellulose-plastic composites upstream of the restricted zone 26 in the extrusion system. For example, in extrusion systems as shown in FIG. 3 with an extruder 32 upstream of the adapter die 20, the restricted zone 26 causes more composite material 34 to reside in the extruder 32 at any one time. This in turn increases the amount of time the composite material 34 remains in the extruder 32, where it is exposed to mechanical agitation, mixing, and, thus, heat exposure. A modified adapter die 20 with a restricted zone 26 thus increases heat exposed to the extrudate without decreasing output production rate.

The increase in residence time, mechanical agitation, mixing, and heat exposure promote a more homogeneous composite by thoroughly dispersing formulation ingredients in the composite matrix. This is particularly beneficial when using recycled materials, which require higher processing temperatures and mixing due to the impurities contained therein. For these reasons, modified adapter dies 20 having restricted zones 26 can be advantageous when used in otherwise traditional extrusion systems. As will be discussed below, however, the best results are achieved when the modified adaptor die 20 is integrated with modified transition, stranding, and molding dies.

Adapter dies 20 that include a restricted zone 26 may be prone to causing non-uniform flow across the cross-sectional area of the die channels. For the purposes of this application, "non-uniform flow" is defined as an increase in the volume flow rate in $cm^3$/second of a portion of the cross-sectional profile of the extrudate of 1.10 times the volume flow rate relative to another portion of the cross-sectional profile of the extrudate. Depending on the desired characteristics of the final product, "non-uniform flow" may be an increase of about 1.10 times, about 1.50 times, about 2.00 times, about 4.00 times, or about 8.00 times the volume flow rate of a portion of the cross-sectional profile of the extrudate relative to another portion of the cross-sectional profile. "Uniform flow" is defined as the absence of non-uniform flow across the cross-sectional profile of the extrudate. The non-uniform flow resulting from adapter dies 20 with restricted zones 26 originates in the increase in extrudate flow rate as the extrudate passes through the restricted zone 26. The flow rate of the extrudate, however, increases non-uniformly, with the flow increasing more in the center than at the periphery of the adapter channel 16 due to friction between the extrudate and the inner surface of the adapter channel 16. Despite an increase in cross-sectional area from the restricted zone 26 to the rear orifice 14, a "flow memory" typically exhibited by cellulose-plastic composites results in a continuation of the non-uniform flow as the extrudate exits the rear orifice 14 of the adapter die 20.

Non-uniform flow also generally results from increasing production rate by increasing overall flow rate through the system. Flow of the extrudate through the flow channel is resisted by friction between the extrudate and the walls of the flow channel (wall shear). As the overall velocity of the flow increases, the surface resistance also increases. In standard extrusion systems, such as that described by Laver, the flow increases non-uniformly, with the flow increasing more in the center than at the surface of the channels where the flow is resisted by friction. This imbalance is exacerbated as production rates are increased.

Regardless of whether the non-uniform flow results from use of a modified adapter die 20 with a restricted zone 26 or from an overall increase in production rate, the imbalance in flow leads to inconsistencies in the final product by causing edge tearing, surface roughness, and/or distortion of the profile shape of the final extruded product.

The modified dies of the present invention provide a solution to the problem of non-uniform flow by generating more resistance to flow in regions of higher local velocity. This is done in the stranding die by increasing the resistance of individual stranding channels as will be shown in the following examples. Flow resistance at a given velocity can be calculated for the individual stranding channels through fluid mechanics. However, flow rates in distinct areas of the adaptor, transition, and molding dies are difficult to determine. The invention improves the uniformity of flow by integrating the design of the individual dies so that resistance to flow is made equal in all regions of the profile cross section when the dies are combined.

Figure 4:
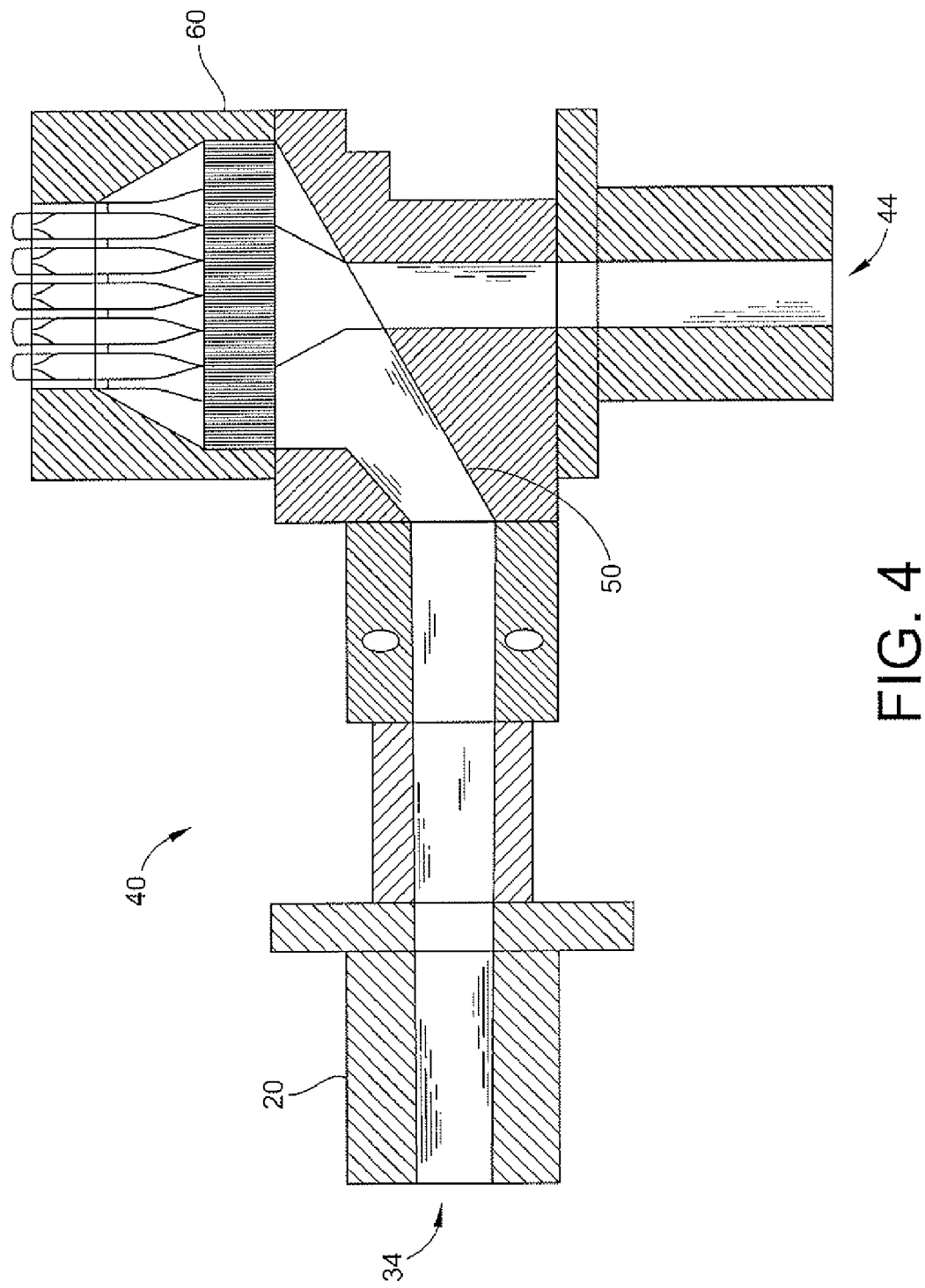
FIG. 4 depicts a top plan view of a cross-head extrusion apparatus.

Modified dies that promote the uniformity of flow will first be shown for a cross-head extrusion apparatus 40, as depicted in FIG. 4. Non-uniform flow is particularly a problem when using such cross-head extrusion apparatuses 40. In cross-head extrusion, the direction of flow through the system upstream of the stranding die is at an angle relative to the direction of flow of the material in the stranding die 60. A cross-head extrusion system may have any angle greater than 0° between the direction of flow upstream of the stranding die relative to the direction of flow in the stranding die. In the particular cross-head extrusion apparatus depicted in FIG. 4, the direction of flow in the extruder and entering the transition die 50 is at a right angle (90°) relative to the direction of flow in the stranding die 60. This cross-head extrusion apparatus in FIG. 4 is designed to extrude cellulose-plastic composite 34 blocks on the top and bottom of a core material 44. The core material 44 is extruded in the typical manner in which the material flows in a straight line from an extruder through the various dies used to form the core. By contrast, the cellulose-plastic composite 34 is extruded at a right angle to the core material and must turn 90° as the blocks are formed above and below the core. This type of extrusion has the problem of the tendency for a fluid to flow along the shortest path because the resistance to flow is the least along that path. This imbalance in flow is exacerbated as the velocity of flow increases.

Figure 5:
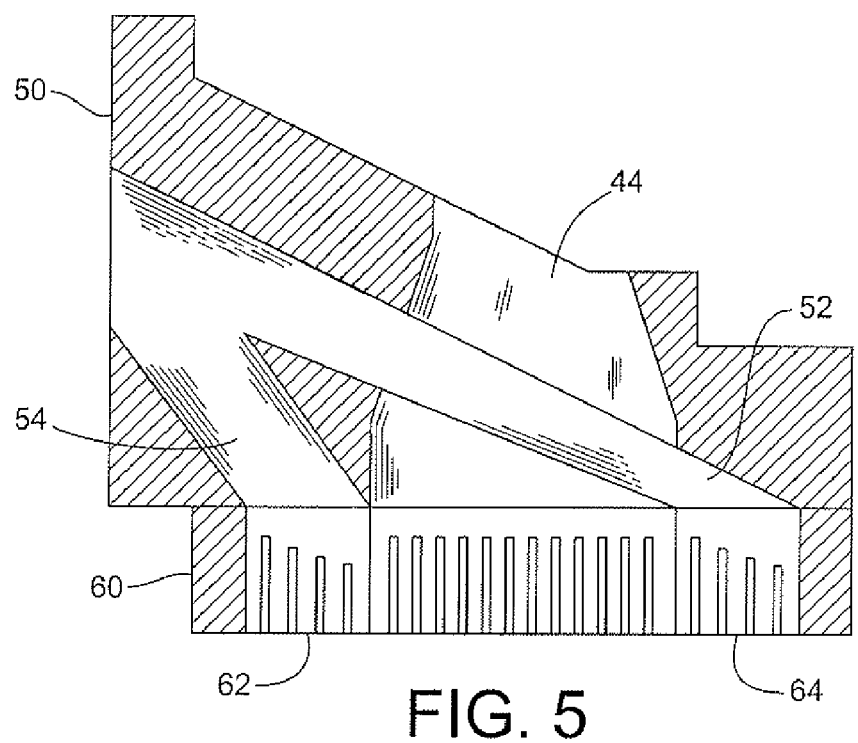
FIG. 5 depicts a cross-sectional side elevation view of a transition die and a stranding die of the current invention for use with a cross-head extrusion apparatus.

FIG. 5 shows a transition die 50 and a stranding die 60 for use in a cross-head extrusion apparatus, which are coordinately designed to provide a uniform pressure drop and uniform flow in all areas of the extruded profile. The transition die 50 as shown has two transition channels, one 52 for the top block and one 54 for the bottom block. The stranding die 60 has two corresponding groups of stranding channels 62, 64.

Figure 6:
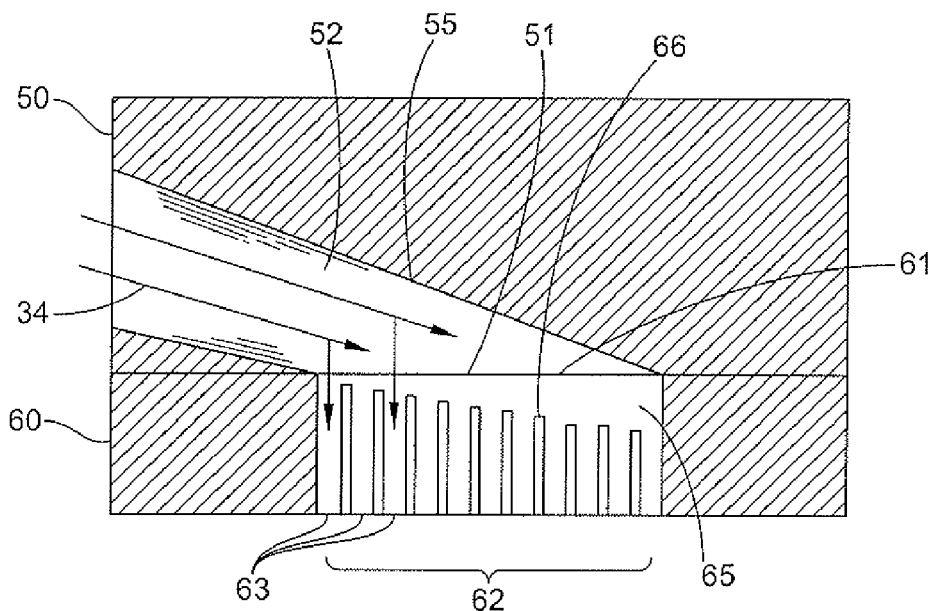
FIG. 6 depicts a close-up of a transition die channel and corresponding stranding channel group of the current invention for use with a cross-head extrusion apparatus.

FIG. 6 shows a close-up of a transition channel 52 and its corresponding stranding channel group 62. (Pair 54, 64 would be similarly configured as described below). The transition die 50 includes a transition channel 52 and a rear orifice 51 (front orifice of the transition die 50 is not shown). The transition channel 52 is tapered such that its cross-sectional area decreases from the front orifice to the rear orifice 51.

The stranding die 60 in FIG. 6 includes a front orifice 61 (rear orifice of the stranding die 60 is not shown) and individual stranding channels 63 comprising the stranding channel group 62. The individual stranding channels 63 in the stranding channels group 62 have different lengths depending on their position in relation to the source of composite material 34 from the transition channel 52. The stranding channels 63 in the stranding die 50 incrementally decrease in length as the distance from the source of composite material 34 increases. The stranding channels 63 closest to the source of composite material 34 (those further to the left-hand side in FIG. 6) have the largest stranding channel length; the stranding channels 63 furthest from the source of the composite material (those further to the right-hand side in FIG. 6) have the shortest stranding channel length; and the intervening stranding channels 63 change incrementally therebetween. The incremental decrease in the length of the stranding channels in the stranding die 60 defines a sloping, porous surface 66 at the entrance of the group of stranding channels 62. This in turn defines a manifold 65 between the inner surface 55 of the transition channel 52 and the sloping surface 66. The taper of the transition channel 52 and the sloping surface 66 generated by the changing length of the stranding channels 63 define a flow channel of decreasing cross section. Material exiting the transition channel 52 first contacts the sloping surface at the proximal side of the stranding channel group 62 and must flow perpendicularly across the sloping surface 66 to reach the distal side of the stranding channel group 62. As shown in FIG. 6, a portion of the material will enter each stranding channel 63 as the material makes its way across the surface 66. The taper of the transition channel 52 and the slope of the surface 66 defined by the stranding channels 63 are calculated to compensate for the reduction of flow that occurs as material leaves the transition die 50 through successive rows of stranding channels 63.

FIG. 7 shows results of coordinately integrating the designs of a transition die and stranding die in the manner shown in FIG. 6. Each row of the table represents a segment of the manifold and of the stranding channels. A segment of the manifold is the area lying over each stranding channel 63. A segment of the stranding channels consists in the area defined by each stranding channel. Column 1 of FIG. 7 (the first column) lists the segment number, Column 2 shows the manifold width of each segment. Column 3 shows the height of each segment, taken as the average of the heights at the beginning and end of the segment. Segment height decreases because of the taper of the transition die orifice. Column 4 shows the flow rate through each segment. The flow in segment 1 feeds the flow in the following segments and the first row of stranding channels and so on. Column 5 shows the pressure drop required to move material from the entrance of the manifold to each segment at the flow rate shown in the fourth column. Columns 6 and 7 are shape factors a and b used to calculate the pressure drop in each segment according to the method developed by Kozicki (Kozicki, W., Chou, C. H., and Tiu, C., "Non-Newtonian flow in ducts of arbitrary cross section," *Chemical Engineering Science*, 1966, Vol. 21, pp. 665-679). See Equation 1, developed by Kozicki:

$$\Delta P = \frac{LM}{R_h}\left[\frac{2Q(a+bn)}{R_h A n}\right]^n \qquad \text{Equation 1}$$

where $\Delta P$ is the calculated pressure drop, L is the length of the duct, M is the consistency of the material (calculated from viscosity by methods known), $R_h$ is the hydraulic radius (cross sectional area divided by the length of the perimeter) of the duct, Q is the volume flow rate of the fluid, a and b are shape factors, A is the cross sectional area of the duct, and n is the power law exponent that describes the behavior of the fluid. Column 8 shows the length of each stranding channel. Column 9 gives the pressure drop required to move material through a tube of that length with a predetermined diameter at the flow rate given in Column 10. Column 11 shows the total pressure drop, which includes the pressure drop in the manifold plus the pressure drop in the stranding channel for each segment. The term "pressure drop" refers to the difference in pressure between various internal portions of an extruder system.

As shown in FIG. 7, the total predicted pressure drop for all segments of the improved stranding die is very uniform, ranging from 1570 psi to 1504 psi.

FIG. 8 shows the same calculations performed in FIG. 9 but with stranding channels of equal length (see eighth column of FIG. 8). As shown in the rightmost column of the table in FIG. 8, there is a much wider variation in predicted pressure drops ranging from 1570 psi to 1764 psi. This design does not attain the consistent total pressure drop and uniform flow attained in the design of the current invention.

FIG. 9 shows the pressure drops expected (see rightmost column) when the taper of the manifold (see third column) and length of stranding channels (see eighth column) are not integrated. Such a design does not attain the consistent total pressure drop and uniform flow attained in the design of the current invention.

The examples shown in FIGS. 7-9 show pressure drops resulting from two-dimensional flow paths in cross-head die systems. The integrated transition die and stranding channel length design of the current invention may also be applied to the design of three-dimensional flow paths typical in standard (i.e., non-cross-head or "straight") extrusion die systems. In a straight extrusion system, the shortest flow path is typically in the center of the die. The methods employed for designing modified dies for generating uniform flow in the cross-head extrusion apparatus will now be shown with reference to FIGS. 10-15 for generating uniform flow in standard extrusion systems.

Figure 10:
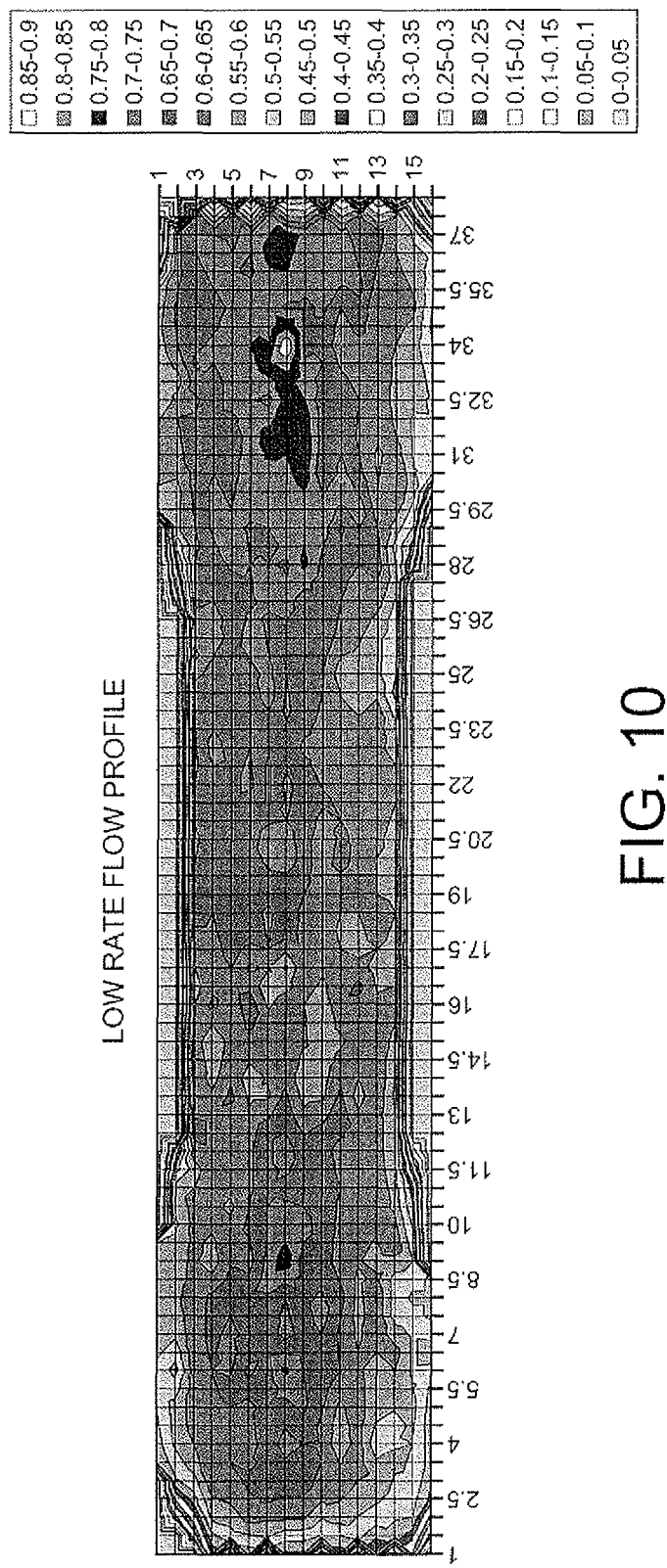
FIG. 10 shows a profile map of extrudate flow rate in $cm^3$/second from a stranding die at low production rate.
Figure 11:
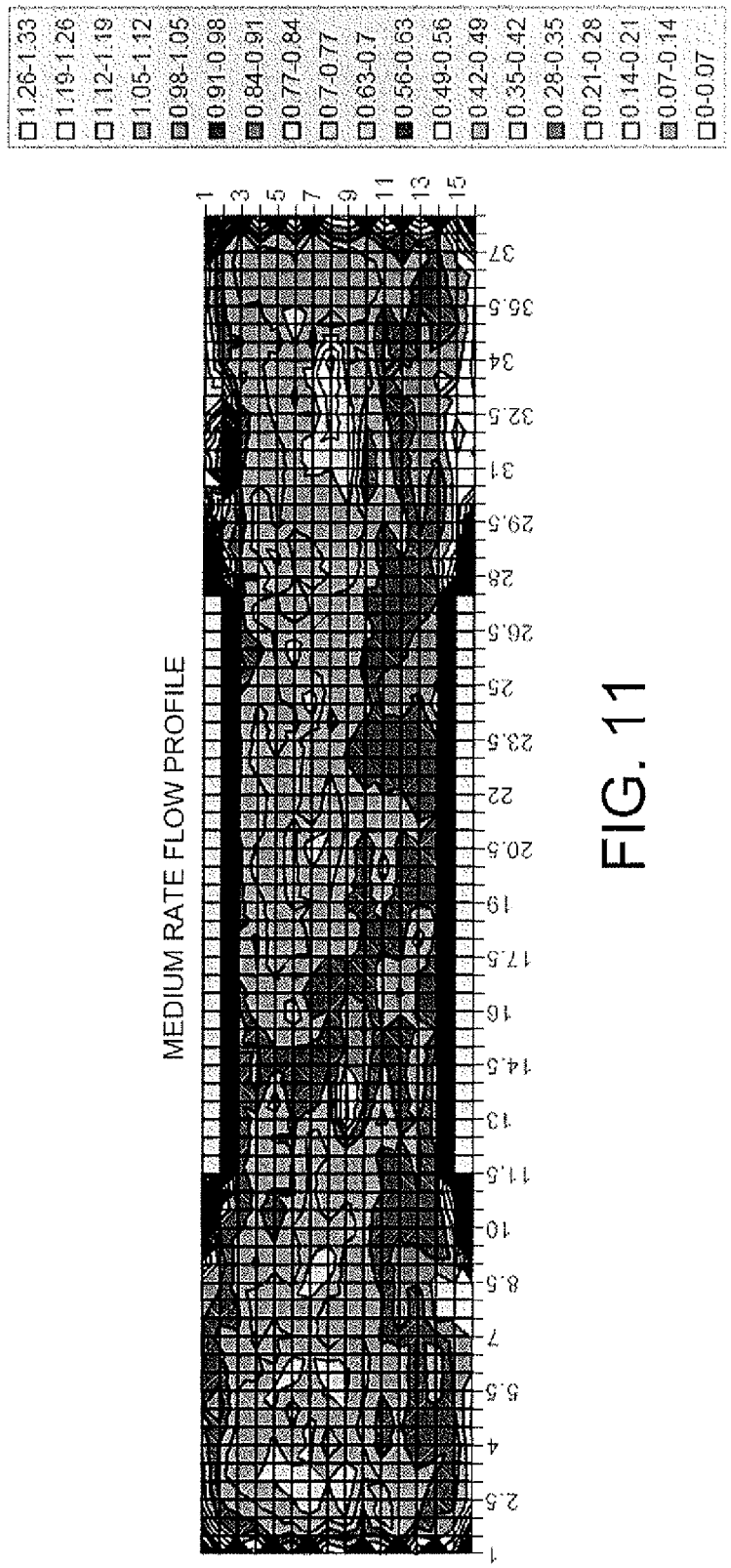
FIG. 11 shows a profile map of extrudate flow rate in $cm^3$/second from a stranding die at medium production rate.
Figure 12:
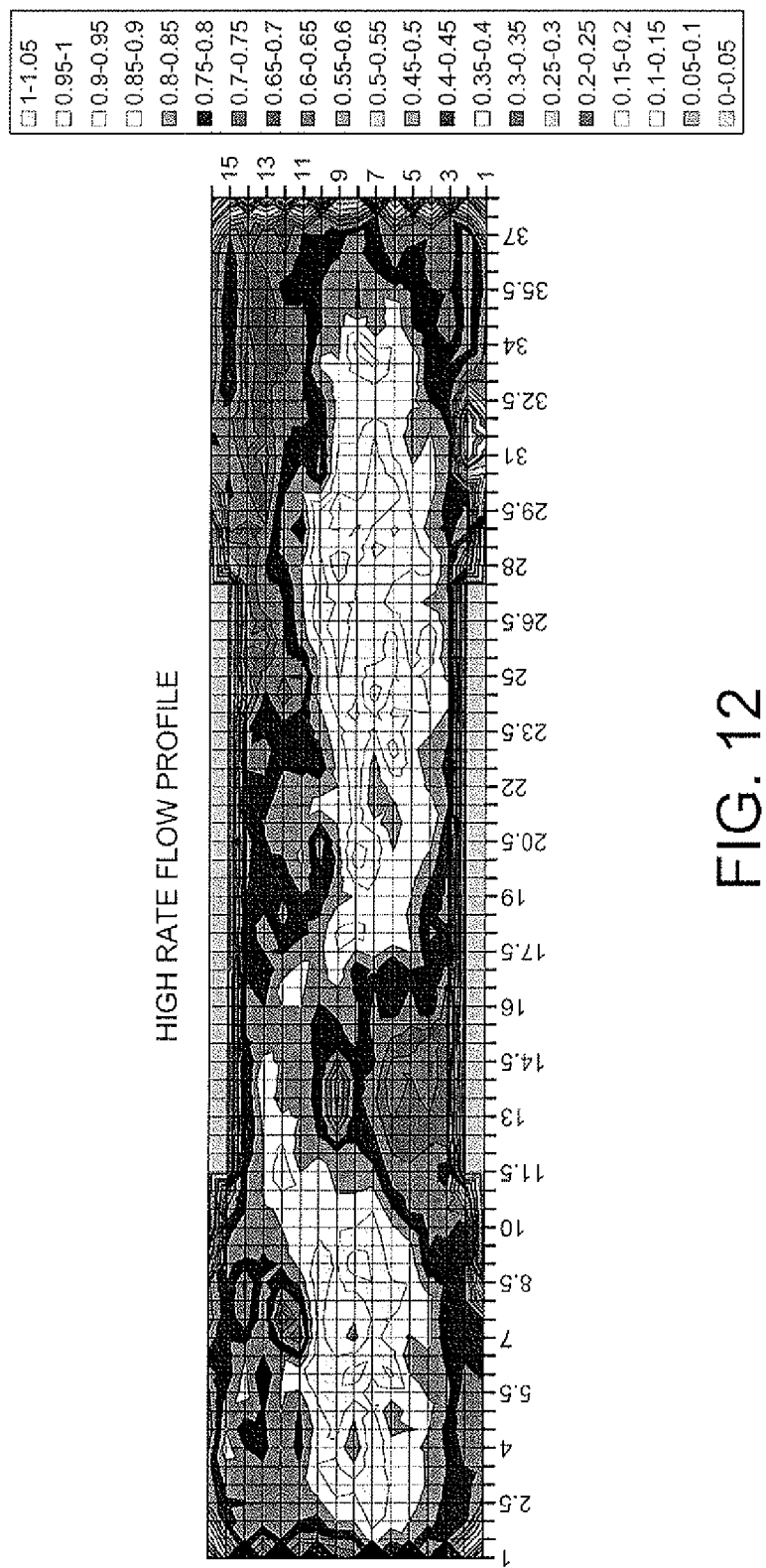
FIG. 12 shows a profile map of extrudate flow rate in $cm^3$/second from a stranding die at high production rate.

FIGS. 10-12 are contour graphs showing the gradual induction of non-uniformity in flow upon increasing production rates in a standard deck board extrusion system. Each band on the graphs represents a narrow range of mass flow rates. Positions on the graph correspond to positions across cross-sectional profile of a stranding die. To generate the graphs, a stranding die with uniform stranding channel size and length typical of Laver was used to separate flow. The molding die and setting die were removed so that the extruded material exited the stranding die to atmospheric pressure. A stranding die so configured functions in the manner of an array of capillary dies. The flow rate through a capillary die can be characterized by rearranging Equation 1 from Kozicki to Equation 2:

$$Q = \frac{R_h A n}{2(a+bn)} \left[\frac{R_h \Delta P}{LM}\right]^{\frac{1}{n}} \qquad \text{Equation 2}$$

In a stranding die with uniform stranding channel length and size, the hydraulic radius, area, length, and shape factors are the same for every channel. Material properties M and n can be assumed to be equal on average in the material passing through every stranding channel, as the cellulose-plastic composite entering the stranding die is assumed to be homogeneous. Differences in flow rates can therefore be attributed to differences in pressure drop ($\Delta P$) experienced by the material as it passes through the stranding channels. Because material exits the stranding plate to atmospheric normal air pressure, the exit pressure for every stranding channel is the same. Differences in $\Delta P$ can be attributed to variations in pressure at the entrance to the stranding channels. The mass flow rates therefore provide a map of the pressure field in the manifold.

FIGS. 10, 11, and 12 are maps of flow rates at low, medium, and high production rates, respectively. The contour lines in the graphs become more numerous and more tightly packed as production rate increases. This shows a decrease in uniformity of material flow as production rate increases.

Figure 13:
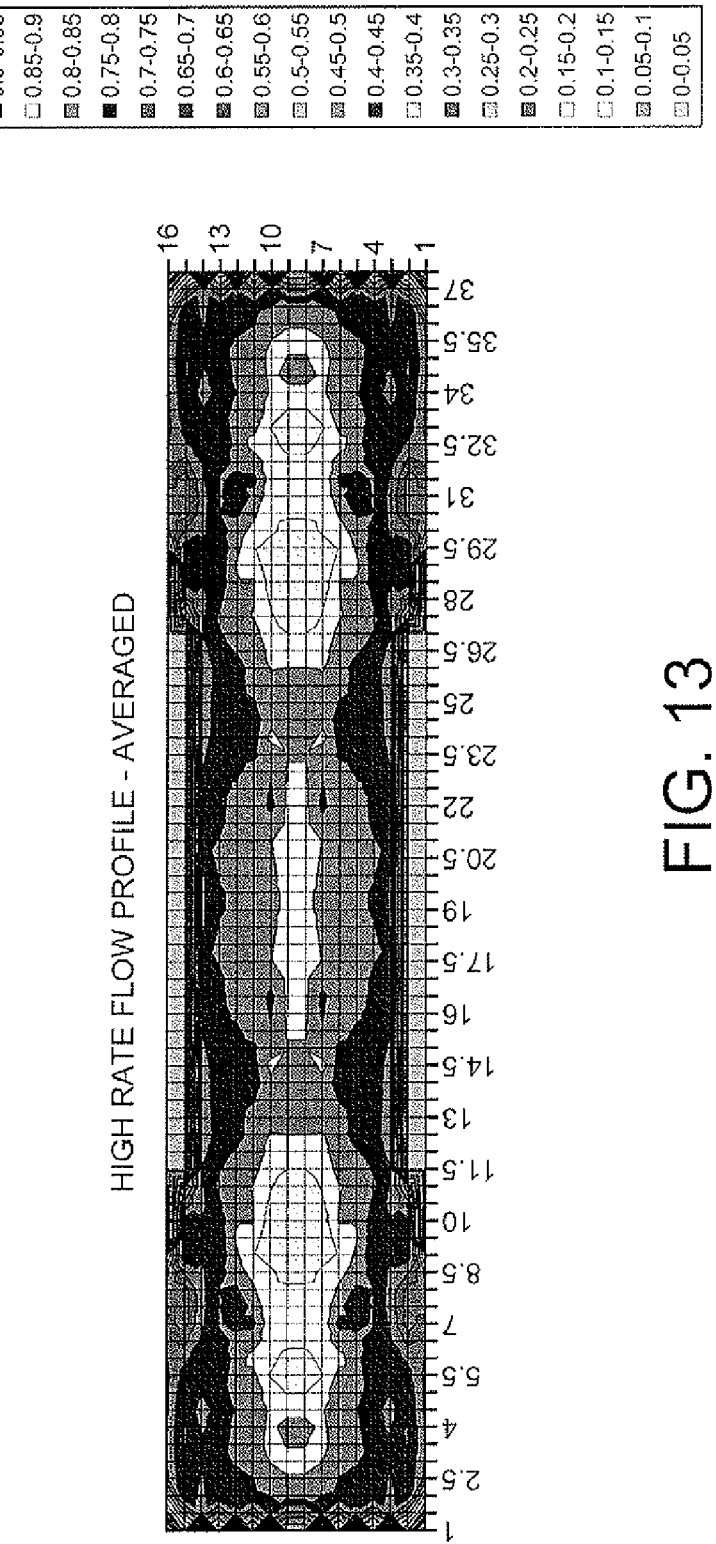
FIG. 13 shows a profile map of average extrudate flow rates in $cm^3$/second derived from the flow rates of FIG. 12.
Figure 14:
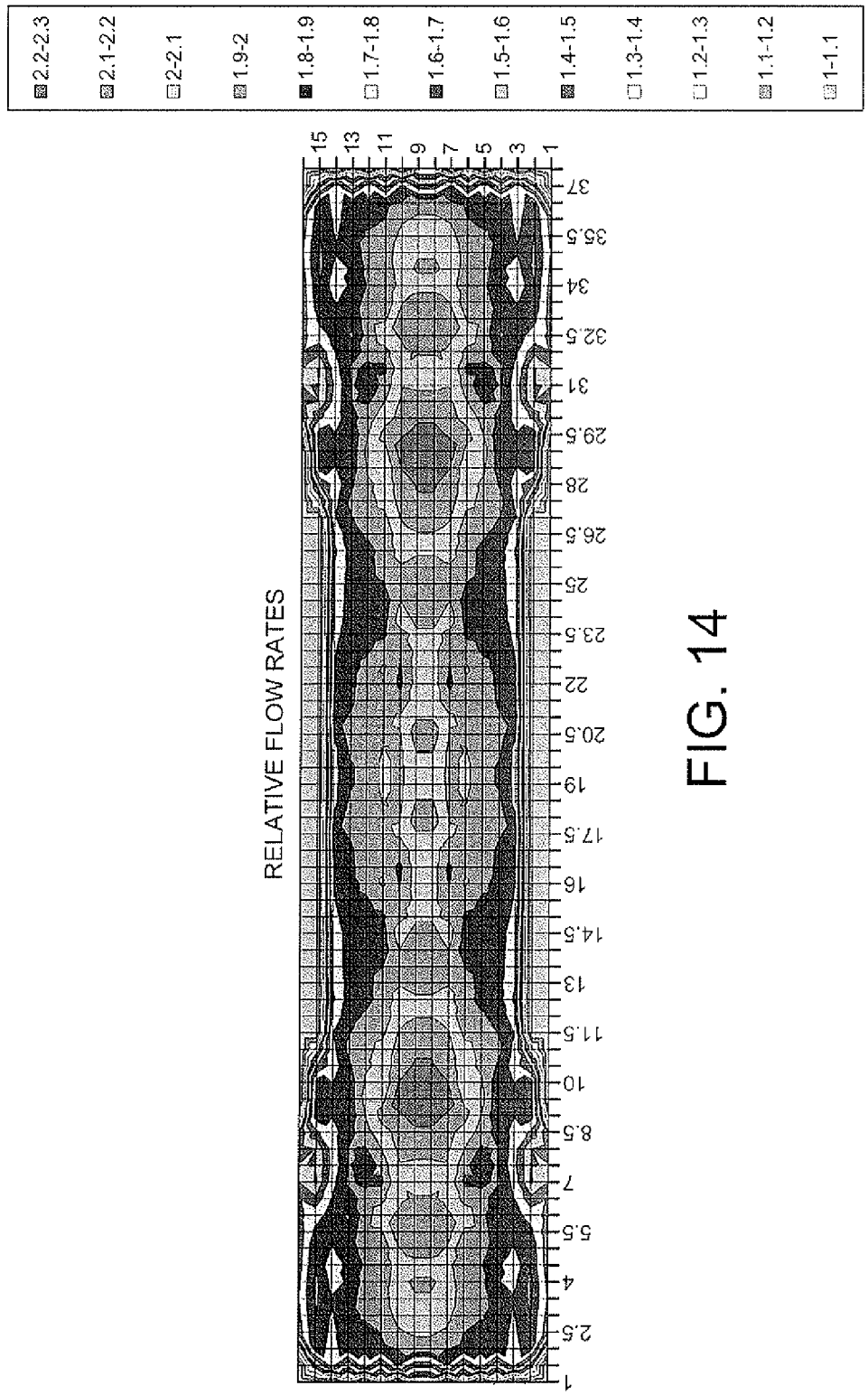
FIG. 14 shows a profile map of relative extrudate flow rates derived from the average flow rates of FIG. 13.

Design of coordinate transition dies and stranding dies to correct the non-uniform flow rates of FIG. 12 can occur as follows. The flow rate map of FIG. 12 can be divided into four quadrants by evenly bisecting the map on the X and Y axes. Each stranding channel then has three other stranding channels that occupy a corresponding position in the other three quadrants. Averaging the flow rates of the four stranding channels in each corresponding position of the four quadrants results in a flow map that is symmetrical about a vertical and a horizontal axis. Such an averaged flow rate map is illustrated in FIG. 13. In FIG. 14, the average flow rates of FIG. 13 are converted to relative values, dimensionless numbers, by dividing the flow rate at each location by the minimum flow rate for the entire field. Values range from 1, the minimum flow rate, to 2.24 or slightly more than twice the minimum flow rate, with the highest flow rates occurring in the center of the profile, and the lowest flow rates occurring in the periphery of the profile.

Figure 15:
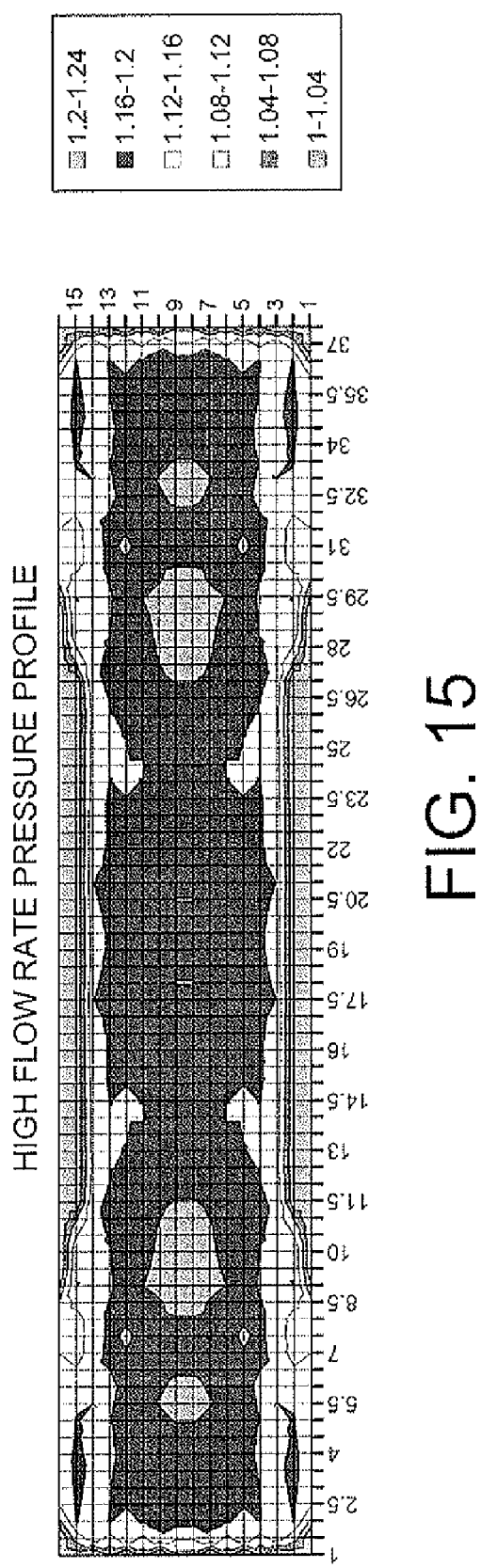
FIG. 15 shows a profile map of relative pressure drop distribution calculated from the relative flow rates of FIG. 14.

The flow rates of individual stranding channels can be adjusted to attain a uniform flow rate profile by altering the length of the stranding channels as follows. Because flow rate is related to $\Delta P$ as shown in Equations 1 and 2, one can use the relative flow rate map of FIG. 14 to create a map of the relative pressure drop distribution across the flow channel, as shown in FIG. 15. Values in FIG. 15 range from 1 to 1.21. The range of relative pressure drop values shown in FIG. 15 is much smaller than that of the relative flow rates due to the nature of the specific fluid extrudate used in this example. Referring again to Equation 2, it can be seen that flow rate Q is related to the pressure drop $\Delta P$ by an exponent of 1/n where n is the power law exponent that describes the flow induced behavior of a fluid. The power law exponent that describes the fluid used in this example is 0.24 so that a change in pressure causes a change in flow that is quadrupled (1/0.24=4.167).

The flow equation shows that flow channel length L is related to flow rate Q in the same manner as $\Delta P$. Using the improved method of this invention, the flow rates can be balanced through the stranding die by altering the length (L) of the stranding channels without altering the pressure distribution in the transition die. Transition dies in standard extrusion systems may employ an annular taper. Such a taper, which defines a manifold with respect to the sloping surface defined by the front face of the stranding die, is accounted for in determining the length of the stranding channels.

In the case outlined in FIGS. 10-15 for a standard extrusion system, the sloping surface 66 defined by the differing lengths of the stranding channels in the stranding die would not be sloped from one side to the other, as shown for the sloping surface 66 in FIG. 6. Rather, the sloping surface in the case outlined in FIGS. 10-15 would have a compound, convex or arcuate sloping surface (when viewed from the front of the stranding die) with the longest channels located in the center of the stranding die profile, the shortest channels located at the perimeter of the stranding die profile, and the lengths progressively decreasing from the center to the periphery. In a preferred version, the actual lengths of the individual stranding channels (and the slope of the sloping surface) would depend on the taper of the transition channel immediately preceding the stranding die. The ratio of the longest stranding channel to the shortest stranding channel in the stranding die profile may be equal to or greater than about 1:1, 1.01:1, 1.05:1 1.1:1, 1.2:1, 1.3:1, 1.4:1, 1.5:1, 2:1, or 4:1. Acceptable ratio ranges include about 1.1:1 to about 4:1 and are preferably about 1.3:1 to about 3:1. The most preferred ratio varies according to the formulation and resin used.

In another version of the invention, the sloping surface 66 of the stranding die may be reversed so that the stranding channel length is greater at the periphery, and the lengths progressively decrease from the periphery to the center. Thus, rather than having a convex (when viewed from the front of the stranding die) sloping surface, the stranding die in this version would have a concave sloping surface. This type of sloping surface is envisioned as particularly useful when extruding composites that utilize resins with melting points or required processing temperatures that are in the range where decomposition of the cellulosic fiber will start to occur. These resins have higher melting points and/or processing temperatures than resins commonly used in the production of cellulosic composites and are useful in downstream applications that require a greater degree of heat resistance. Many so-called engineering resins such as nylons, polyethylene terephthalate (PET), and polyaryletheretherketone (PEEK) are examples of such resins Cellulosic composites produced with these higher-temperature resins must be processed at as low a temperature as possible so as not to decompose the cellulosic fiber. Processing at temperatures at the low end of the resins' melting points leads to hardening or crystallization of the resin in the die system, and this often interferes with shaping of the product in the extruder. Heating the dies will maintain the fluidity at the surface of the extrudate, but the heat will not penetrate to the center of the extrudate. As the center of the extrudate cools, the viscosity of the resin will increase in this area. Balanced flow can be achieved in this instance by decreasing the resistance shortening the stranding channels—in the center of the stranding die. In this version of the invention, the ratio of the length of the longest stranding channel located at the periphery of the stranding die to the shortest channel located at the center of the stranding die may be equal to or greater than about 1:1, 1.01:1, 1:05:1, 1.1:1, 1.2:1, 1.3:1, 1.4:1, 1.5:1, 2:1, or 4:1. Acceptable ratio ranges include from about 1.1:1 to about 3:1. The preferred range is about 1.1:1 to about 2:1.

Generating transition and stranding dies with balanced composite flow across the stranding die can also be achieved by adjusting the cross-sectional area of the stranding channels. Design of such transition and stranding die combinations would be performed in a manner similar to the method shown above and shown in FIGS. 10-15 for varying stranding channel length. However, increased resistance to flow would be created by decreasing cross-sectional area of the stranding channel rather than (or in addition to) adjusting channel length. Equation 1 shows that the pressure drop ΔP is inversely related to the cross-sectional area A of a flow channel. The pressure drop and resistance to flow can be increased by reducing the cross-sectional area of the stranding channels. The pressure drop and resistance to flow can be decreased by increasing the cross-sectional area of the stranding channels. Pressure balance in the transition die would be maintained by calculating flow rates and pressure drops as above. Such a design would facilitate the production of products with a static density while promoting homogeneity within the composite.

To balance flow in the case outlined in FIGS. 10-15 for a standard extrusion system, the cross-sectional area of the stranding channels would be the least in the center of the profile, the greatest at the periphery of the profile, and would progressively increase from the center to the periphery of the profile. In a preferred version, the cross-sectional area of the individual stranding channels would depend on the taper of the transition channel immediately preceding the stranding die. The ratio of the greatest cross-sectional area of a stranding channel to the least cross-sectional area in the stranding die profile may be equal to or greater than about 1:1, 1.01:1, 1.05:1, 1.1:1, 1.2:1, 1.3:1, 1.4:1, 1.5:1, 2:1, or 4:1. Acceptable ratio ranges include about 1.1:1 to about 4:1 and are preferably about 1.3:1 to about 2.5:1. The most preferred ratio varies according to the formulation and resin used.

In a version for use with engineering resins with high melting points, the cross-sectional area of the stranding channels would be the greatest in the center of the profile, the least in the periphery of the profile, and would progressively decrease from the center to the periphery of the profile. In this version, the ratio of the greatest cross-sectional area in the center of the profile to the least cross-sectional area in the periphery of the profile may be equal to or greater than about 1:1, 1.01:1, 1.05:1, 1.1:1, 1.2:1, 1.3:1, 1.4:1, 1.5:1, 2:1, or 4:1. Acceptable ratio ranges include about from about 1.1:1 to about 3:1. The preferred range is about 1.1:1 to about 2:1.

Figure 16A:
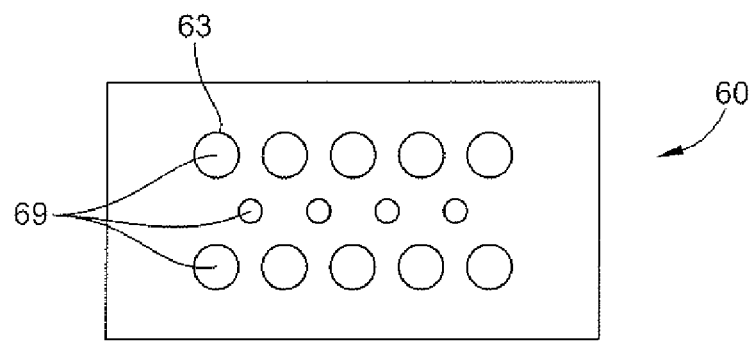
FIG. 16A shows a front elevation view of a stranding die having stranding channels with differing cross-sectional area and with equal distances between the centerlines of each stranding channel.

When adjusting extrudate flow by changing the cross-sectional area of the stranding channels, various stranding channel configurations are possible. In one configuration, shown in FIG. 16A, each stranding channel 63 is positioned within the cross-sectional profile of the stranding die 60 with an equal distance between each stranding channel's 63 centerline 69. Such a configuration results in varying distances between the stranding channels 63. A stranding die 60 with this configuration and having wider stranding channels 63 in the periphery of the die and narrower channels 63 in the center would allow extrudate strands in the center of the stranding die 60 more room to expand as the extrudate leaves the stranding die 60 than the extrudate strands in the periphery. This results in a reduced density in the center of the profile of the extruded product.

Figure 16B:
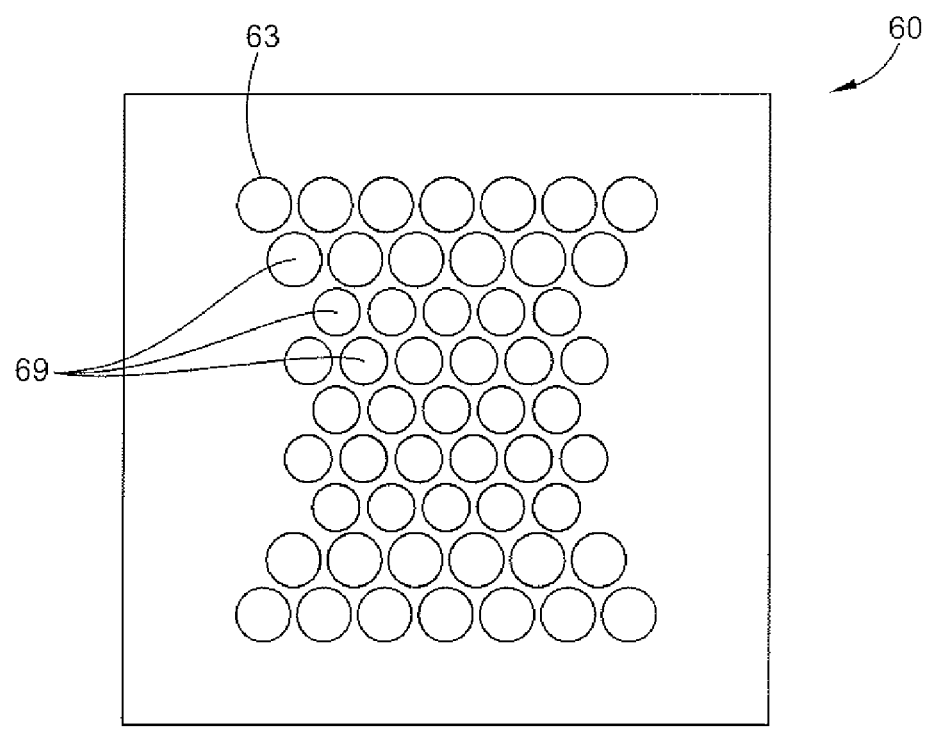
FIG. 16B shows a front elevation view of a stranding die having stranding channels with differing cross-sectional area and with unequal distances between the centerlines of each stranding channel to minimize the distance between the stranding channels.

A second configuration for a stranding die having stranding channels with differing cross-sectional area is shown in FIG. 16B. In this configuration, the distance between centerlines 69 of the stranding channels 63 changes as the cross-sectional area of the channels 63 change so that the distance between the stranding channels 63 themselves remains as constant as possible within the limits of geometry. This configuration allows for an adjustment of extrudate flow rate without a reduction of density in a portion of the cross-sectional profile.

A novelty of the present invention is that it allows users to choose different combinations of dies for generating specific effects. For instance, the size of the rear orifice at the adapter die is directly related to the combined cross-sectional area of the stranding channels in the stranding die. Typically, as the latter increases, so does the former. Orifice size, however, is also directly related to the length of time required for a composite to pass completely through the system. While increasing orifice size boosts production rates, it decreases the uniformity of the composite mixture. In addition, manufacturers are often required to choose between maximizing the effectiveness of the stranding die and providing optimal residence time. In the present invention, the size and shape of the adapter die channel can be altered independently of the combined cross-sectional area of the stranding channels in the stranding die due to the methods of equating flow described herein. Because all the dies in the invention can be replaced, benefits lost due to a modification at one die can be regained by making a modification elsewhere. Specifically, the orifice shape, transition die design, stranding die design, or any combination of these characteristics can be varied to alter the effectiveness of the stranding die, the homogeny of the composite, and the rate of production.

Figure 17A:
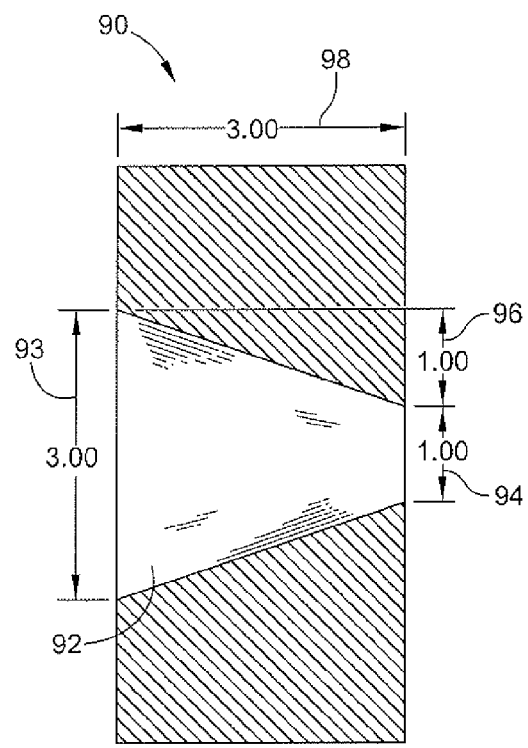
FIG. 17A shows a molding channel in a molding die that compresses extrudate into a profile with a thickness of 1.0 inch.
Figure 17B:
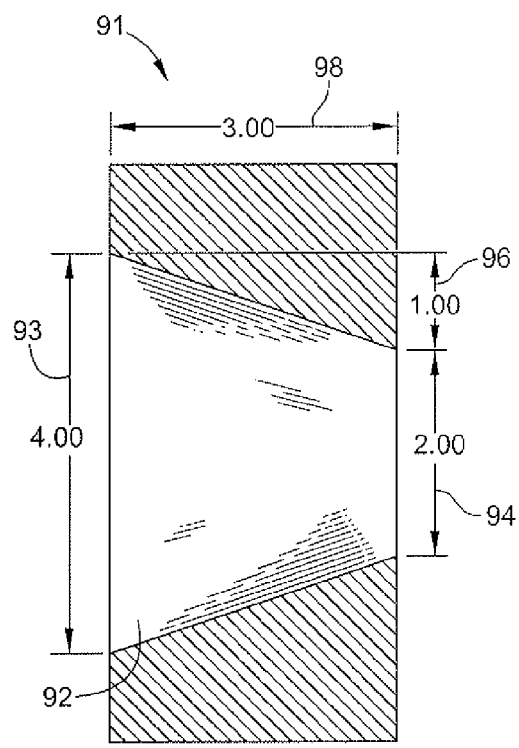
FIG. 17B shows a molding channel in a molding die that compresses extrudate into a profile thickness of 2.0 inches.

The modified dies and methods of balancing composite flow across the cross-sectional profile described herein can be used in combination with modified molding dies. This is particularly useful for generating a wide range of product sizes. FIGS. 17A and 17B show two molding dies 90, 91 having molding channels 92 structured to extrude products of different sizes. The molding channel 92 of each molding die 90, 91 is defined by a front orifice 93, a rear orifice 94, and a length 98. The molding channel 92 is further defined by a molding channel offset 96, which is itself defined by a distance between the outermost position of the molding channel 92 at the front orifice 93 and the outermost portion of the molding channel 92 at the rear orifice 94. The size of the rear orifice 94 determines the size of the final product.

Three factors of molding dies which affect the qualities of the final extruded product are compression ratio, die convergence, and molding channel length 98. The compression ratio reflects the amount of compression imposed by the molding die on the extrudate. The compression ratio is defined by the ratio of the cross-sectional area of the front orifice 93 to the cross-sectional area of the rear orifice 94. For example, the compression ratios of the molding dies 90, 91 in FIGS. 17A and 17B are 3:1 and 2:1, respectively. It is advantageous to maximize the compression ratio as higher compression ratios increase the strength of the inter-strand welds and, thus, the strength of the extruded product.

The die convergence reflects the slope at which the molding channel 92 is reduced as it changes from the size of the front orifice 93 to the rear orifice 94. The die convergence is defined by the ratio of the molding channel offset 96 to the length 98. For example, the compression ratios of the molding dies 90, 91 in FIGS. 17A and 17B are each 1:3. It is advantageous for the quality of the final extruded product to minimize the die convergence and length, as increases in either of these factors increases the amount of wall shear imposed on the surface of the extrudate (see below). The wall shear imposes the drag on the periphery of the extrudate, leading to cracking, tearing, and roughness on the surface of the final product.

The relationship between die length and wall shear is shown in Equation 1, as described above. By contrast, the relationship between die convergence angle and wall shear can be illustrated by Equation 3 from Huang and Shroff (Huang, D. C. and Shroff, R. N., "Converging Flow of Polymer Melts," *Journal of Rheology*, 1981, Vol. 21, No. 6, pp 605-617):

$$P_0 = \int_{V_0}^{V_e} \frac{\sigma_{\theta\theta}}{2V_r} dV_r + F(\beta)(\sigma_{12})_e \qquad \text{Equation 3}$$

$P_0$ is the pressure at the entrance to the converging die. The integral represents the pressure related to extensional flow (acceleration of flow caused by squeezing the volume into a smaller space). The second term represents the part of the pressure related to wall shear forces. In the second term, $F(\beta)$ is a shape factor related to die shape and convergence angle, and $(\sigma_{12})_e$ is the wall shear stress at the die exit. For a flat converging die channel such as the one shown in FIG. 17A or FIG. 177B, the shape factor is $F(\beta)=\frac{1}{2}(\beta)$, where $\beta$ is the convergence angle. From this relationship, it can be seen that as the convergence angle increases, the pressure related to wall shear increases, and the shear stress imposed on the extrudate also increases.

In view of the above constraints and relationships, problems arise when increasing the size of an extruded product. In order to increase product size while keeping the die convergence and molding channel length constant, the compression ratio necessarily decreases. Conversely, maintaining the compression ratio as product size increases requires that the die convergence and/or molding channel length be increased. This trade-off is shown in the molding dies 90, 91 in FIGS. 17A and 17B. FIG. 17A shows a molding die with a rear orifice 94 width of 1.0 inch. FIG. 17B shows a molding die with a rear orifice 94 enlarged from 1.0 to 2.0 inches to increase the extruded product size. In order to minimize shear forces on the outer strands of the extrudate, the front orifice 93 in the molding die 91 of FIG. 17B is enlarged from 3.0 to 4.0 inches to keep the die convergence and length 98 constant. This, however, causes a lower compression ratio for the molding die 91 of FIG. 17B (2:1) compared to the molding die 90 of FIG. 17A (3:1), resulting in a decrease in the strength of inter-strand welds. Increasing the compression ratio can only be achieved by further increasing the front orifice 93, but this requires also increasing either the die convergence or the length 98 of the molding die 91, which would lead to surface defects in the final product.

The modified dies described herein provide a solution to minimize the effects of the trade-off between compression ratio and die convergence/length. By adjusting the stranding channel length or cross-sectional area, the resistance to flow across the entire cross section of the extrudate profile can be fine-tuned as the extrudate leaves the stranding die and enters the molding die. This fine-tuning can compensate for the increases of shear stress imposed on the extrudate by any increases in die convergence and length as the size of the product is increased. In a simple rectangular profile, this is accomplished by impeding the flow in the center of the profile either by increasing stranding channel length or decreasing stranding channel cross-sectional area so that uniform velocities are achieved when the profile exits the setting die. Such coordinate modifications to both the stranding and molding dies allow manufacturers to alter the length and/or die convergence of the molding die while maximizing the compression ratio to generate increased sizes of extruded products without minimizing consistency or strength of the final product. The lengths used in the present modified molding dies may be 2, 3, 4 inches or longer. The lengths may range from about 2 to about 6 inches and are preferably about 2 to about 4 inches. The modified dies of the present invention allow for compression ratios in the modified molding dies to be equal to or greater than about 1.5:1, 2:1, 4:1, 6:1, or 8:1 without detracting from the consistency or strength of the final product. Acceptable compression ratio ranges include about 1.5:1 to about 8:1 and are preferably about 1.5:1 to about 6:1. The most preferred compression ratio varies according to the profile shape, formulation, and resin used.

Figure 18:
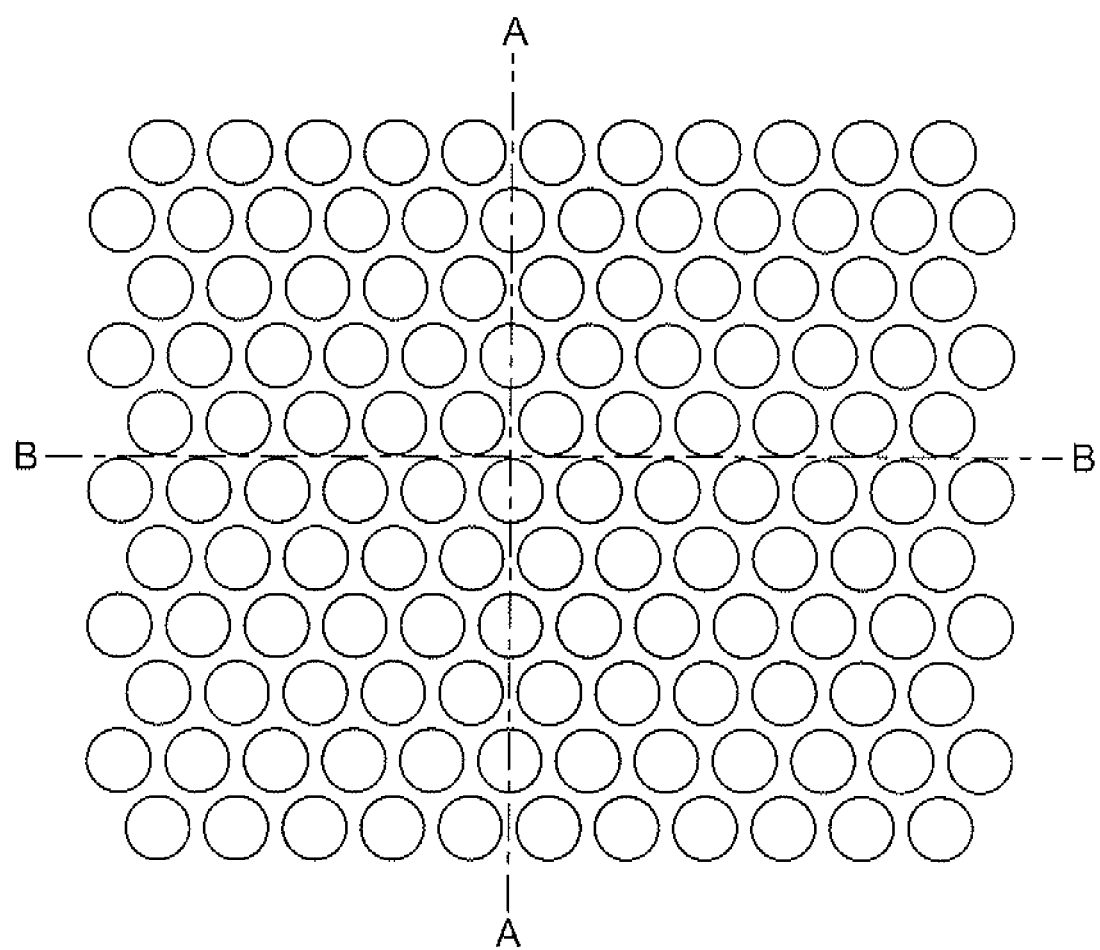
FIG. 18 is a front elevation view of stranding channels showing orientation planes.

The present invention also provides for modified stranding dies that strengthen an extruded end-product in a specific orientation. The bonds which form the product and sustain it against shear forces are referred to as inter-strand welds. By design, the stranding die has planes of orientation which determine the surface area available to create inter-strand welds. The angle of these planes can be altered to provide greater resistance to shear deformation and shear stress based upon anticipated loadings. Typical planes of orientation are illustrated in FIG. 18, which shows one possible arrangement of stranding channels. The strands produced by these stranding channels will be pressed together in the molding die and the adjoining surfaces will be welded together by interlocking of the polymer chains in those surfaces. The strands will maintain the spatial positions imposed by the stranding die so that the inter-strand welds occur where the spaces between the stranding channels are located. The two lines in FIG. 18, A-A and B-B, show the orientations of two planes passing through the arrangement of stranding channels. The plane that passes through line A-A intersects a strand in every other row while the plane that passes through the line B-B passes between the strands. Inter-strand welds that occur in the orientation of line B-B will take the general shape of a straight line while inter-strand welds that occur in the orientation of line A-A will take a circuitous path around the intersected strands. This has practical significance to the performance of cellulose plastic composites produced with this technology.

The effect of these lines of orientation on shear strength is shown in FIGS. 19A and 19B. To test the shear force along line A-A in FIG. 18, ten deck board specimens were prepared to apply a shear force along a plane perpendicular to the narrower dimension of the deck board profile. To test the shear force along line B-B in FIG. 18, an additional ten specimens from the identical deck board were prepared to apply a shear force along a plane perpendicular to the wider dimension of the profile. Average shear strength of the ten specimens tested along line A-A was 1790 lb/in$^2$ (FIG. 19A) compared to average shear strength of 925 lb/in$^2$ for the ten specimens tested along line B-B (FIG. 19B). This is an increase of 93.5 percent.

The difference in shear strength between the planes defined by A-A and B-B has practical implications in the use of cellulose plastic composites as building materials. The cellulose-plastic composite manufactured with the methods provided by Laver is decay resistant and has a high level of compressive strength. These attributes make the material suitable for use as sill plates in wood frame construction. However, because the composite is susceptible to shear forces in certain orientations, it is less than ideal for certain applications. For example, a sill plate is a flat plank shaped member that lies between the rest of the wood framing and the foundation. The sill plate transfers both the compressive loads and shear loads from the rest of the structure to the foundation and ultimately to the earth. Compressive loads are due to the weight of the structure and contents. Shear forces result from wind and earth movements. Improving the shear strength of the sill plate will enable the structure to resist higher shear forces.

The shape of the channels in the stranding die can be designed to increase the amount of inter-strand weld surface exposed to shear forces. A shape that provides more surface area for inter-strand welding would provide greater resistance to shear forces. For example, a product designed to serve as a flat plank such as a deck board is most likely to develop the highest shear stress in a plane located in the vertical center and parallel to its width. In the stranding die revealed by Laver this plane corresponds to line B-B in FIG. 18, which is the plane of lowest shear resistance. Changing the cross-sectional orientation of stranding channels in the stranding die so that the plane of highest shear stress corresponds to line A-A in FIG. 18 would result in weak planes parallel to the thickness of the deck board which would increase the possibility of splitting at fastener locations. Stranding channels that have been shaped to provide more resistance to shear forces in the plane corresponding to line B-B would be beneficial.

Figure 20:
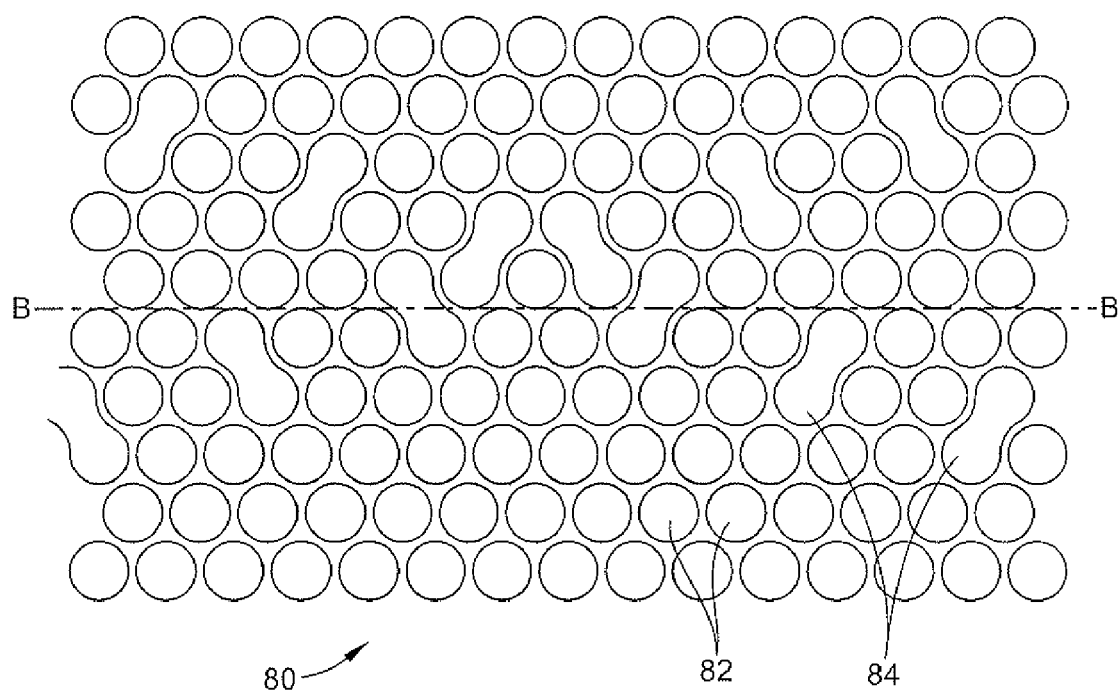
FIG. 20 shows a front view of a stranding channel group incorporating modified stranding channels.

FIG. 20 shows a stranding channel group 80 designed to increase the shear strength of the extruded profile by increasing the surface area available for forming inter-strand welds. The stranding channel group 80 includes stranding channels substantially circular in cross section 82 and modified stranding channels 84, which have a cross-section substantially non-circular in cross section. The modified stranding channels 84 are arranged to interrupt the flat plane between rows of stranding channels. Preferred modified stranding channels 84 include those having an oblong cross-section as shown in FIG. 20. However, any other shape that increases the surface area available for forming inter-strand welds and interrupts the flat plane between rows of stranding channels is contemplated by the present invention.

To test strength of deck boards generated with stranding dies incorporating modified stranding channels, deck boards were extruded using a stranding die with the design shown in FIG. 20 and with a stranding die of conventional design shown in FIG. 18. Specimens were collected from both samples for testing. Specimens were tested in both flexure and shear. Flexure testing was conducted to determine if altering the shape of a portion of the stranding channels had any deleterious effect on flexural strength and stiffness. Shear test specimens were prepared and tested to apply a shear force along a plane perpendicular to the wider dimension of the profile, i.e., along line B-B in FIGS. 18 and 20.

The results of the flexure test are shown in FIGS. 21A and 21B. Flexural strength is denoted by modulus of rupture (MOR). Flexural stiffness is denoted by modulus of elasticity (MOE). Average (mean) MOE and MOR of specimens produced with the conventional stranding channels were 645,400 lb/in$^2$ and 3,700 lb/in$^2$ respectively (FIG. 21A). Average (mean) MOE and MOR of specimens produced with the stranding die containing modified stranding channels were 678,300 lb/in$^2$ and 3,800 lb/in$^2$ respectively (FIG. 21B). The modified stranding channel shape did not have a deleterious effect on either flexural strength or stiffness. A small increase was seen in both properties.

Shear test results are shown in FIGS. 22A and 22B. The average (mean) shear strength of twelve specimens produced with the conventional stranding die was 783 lb/in$^2$ (FIG. 22A). The average (mean) shear strength of twelve specimens produced with the stranding die containing modified stranding channels was 863 lb/in$^2$ (FIG. 22B). A small number of simple, modified stranding channels were effective in increasing shear strength in a prescribed plane by increasing the surface area of inter-strand welds in that plane.

Cellulose plastic composites may replace wood sill plates. Composites have the advantages of improved durability, resistance to decay, and greater compressive strength perpendicular to the length of the sill plate (perpendicular to the grain of a wood sill plate). The present invention provides the ability to produce an extruded profile that has strength properties that can be oriented to provide maximum resistance in the planes of maximum stresses. While wood sill plates must be designed to account for the weak shear strength of wood, a composite sill plate produced with this invention may be designed so that the shear strength is oriented in the most efficient manner.

The cellulose plastic composites of the present invention may include a cellulosic component and a plastic component. The cellulosic component can be virtually any kind of cellulosic material from sawdust to pond sludge and newspapers. The cellulosic material may include old newspapers, alfalfa, wheat pulp, wood chips, wood particles, wood flour, wood flakes, wood fibers, ground wood, wood veneers, wood laminates, kenaf, paper, cardboard, straw, and other cellulosic fibrous materials. The cellulosic fibrous material may also comprise refined cellulose such as cotton or viscous and plant fibers such as kenaf, bamboo or palm fiber, straw or any other cellulosic fibrous material.

The plastic component may include most types of thermoplastic material. The thermoplastic materials serve primarily as a process fluidizer. Examples of thermoplastics that may be used in the present invention include multi-layer films, virgin thermoplastics such as polyethylene, polyurethane, polypropylene, poly-vinyl chloride (PVC), low density polyethylene (LDPE), copoly-ethylene-vinyl acetate, polyethylene terephthalate (PET), polyaryletheretherketone (PEEK), and waste plastic sawdust from other industries as well as other recyclable polymer materials. Although thermoplastic materials are a preferable component in the make-up of the starting materials, they are not required. As long as the starting material includes a sufficient amount of cross-linking agents and lubricants to "plasticize" the mixture in the extruder (see U.S. Pat. No. 5,516,472 for examples of cross-linking agents and lubricants), the starting materials do not necessarily require the use of thermoplastic materials.

The ratio of cellulosic fibers to the thermoplastic material may be between about 1:4 and 1:0. The ratio between the cellulosic fibers to the thermoplastic material is preferably about 1:1.

It is understood that the invention is not confined to the particular construction and arrangement of parts herein illustrated and described, but embraces such modified forms thereof as come within the scope of the following claims.

We claim:

1. An apparatus comprising:
   a source of extrudate flow;
   a stranding die configured to receive extrudate from the source of extrudate flow, including:
   a sloping, front perforated surface;
   a rear perforated surface; and
   a plurality of non-uniform channels extending from the front perforated surface to the rear perforated surface, wherein the source of extrudate flow is configured with respect to the stranding die to feed extrudate against the front perforated surface and through the plurality of non-uniform channels of the stranding die; and
   a transition die configured and dimensioned to connect to the stranding die, the transition die including:

a front orifice;

a rear orifice; and a channel connecting the front orifice to the rear orifice and having an inner surface, wherein the channel includes a tapered zone that decreases in cross-sectional area from that of the front orifice to that of the rear orifice, the channel further includes a space between the inner surface of the tapered zone and the front perforated surface of the stranding die that defines a manifold, and the manifold is coordinately configured and dimensioned with a length and/or cross-sectional area of the channels in the plurality of non-uniform channels in the stranding die to increase uniformity of extrudate flow relative to a stranding die having channels of equal length and cross-sectional area.

2. The apparatus of claim 1 wherein the transition and stranding dies are configured such that a direction of flow of extrudate entering the transition die is at an angle relative to a direction of flow of extrudate entering the stranding die.

3. The apparatus of claim 1 wherein the transition and stranding dies are included in a straight extruder system and the tapered zone defines an annular taper.

4. The apparatus of claim 1 further comprising an adapter die dimensioned and configured to connect to the transition die comprising:

a front orifice;

a rear orifice; and a channel connecting the front orifice to the rear orifice, wherein the channel includes a restricted zone.

5. The apparatus of claim 1 wherein the stranding die is configured and dimensioned to adjust flow of extrudate therethrough and the plurality of non-uniform channels includes channels having differing lengths and/or differing cross-sectional area.

6. The apparatus of claim 1 wherein the plurality of non-uniform channels range in cross-sectional area from a narrowest channel to a widest channel by a factor of at least about 1.01.

7. The apparatus of claim 1 wherein the plurality of non-uniform channels includes channels having centerlines with uniform distances between the centerlines.

8. The apparatus of claim 1 wherein the plurality of non-uniform channels includes channels having centerlines with varying distances between the centerlines.

9. The apparatus of claim 1 wherein the sloping, front perforated surface consists of a consistent slope.

10. The apparatus of claim 1 further including an extruder configured relative to the stranding die such that a direction of flow of extrudate in the extruder is at an angle relative to a direction of flow of extrudate in the stranding die.

11. The apparatus of claim 1 wherein the sloping, front perforated surface comprises variable slope.

12. The apparatus of claim 1 wherein a center of the plurality of non-uniform channels has channels with a greater cross-sectional area than channels in a periphery of the plurality of non-uniform channels.

13. The apparatus of claim 1 wherein a periphery of the plurality of non-uniform channels has channels with a greater cross-sectional area than channels in a center of the plurality of non-uniform channels.

14. The apparatus of claim 1 wherein channels in the plurality of non-uniform channels vary in distance from the source of extrudate flow and wherein the channels decrease in length as the distance from the source of extrudate flow increases.

15. The apparatus of claim 1 wherein the plurality of non-uniform channels includes channels having differing cross-sectional area, and wherein distances between the channels in the plurality of non-uniform channels is as constant as possible within the limits of geometry.

16. The apparatus of claim 1 wherein the plurality of non-uniform channels includes channels substantially circular in cross section and channels substantially non-circular in cross section.

17. The apparatus of claim 16 wherein the channels substantially non-circular in cross section interrupt a plane defined by rows of the channels substantially circular in cross section.

18. An apparatus comprising:

a source of extrudate flow;

a stranding die configured to receive extrudate from the source of extrudate flow, including:

a sloping, front perforated surface;

a rear perforated surface; and a plurality of non-uniform channels extending from the front perforated surface to the rear perforated surface, wherein the source of extrudate flow is configured with respect to the stranding die to feed extrudate against the front perforated surface and through the plurality of non-uniform channels of the stranding die; and a molding die configured and dimensioned to connect to the stranding die, the molding die including:

a front orifice;

a rear orifice; and a channel connecting the front orifice to the rear orifice, wherein a ratio of cross-sectional area of the front orifice to cross-sectional area of the rear orifice defines a compression ratio and the compression ratio is greater than about 1.5:1.

19. An apparatus comprising:

a source of extrudate flow;

a stranding die configured to receive extrudate from the source of extrudate flow, including:

a sloping, front perforated surface;

a rear perforated surface; and a plurality of non-uniform channels extending from the front perforated surface to the rear perforated surface, wherein the source of extrudate flow is configured with respect to the stranding die to feed extrudate against the front perforated surface and through the plurality of non-uniform channels of the stranding die;

a transition die configured and dimensioned to connect to the stranding die, the transition die including:

a front orifice;

a rear orifice; and a channel connecting the front orifice to the rear orifice and having an inner surface, wherein the channel includes a tapered zone that decreases in cross-sectional area from that of the front orifice to that of the rear orifice, the channel further includes a space between the inner surface of the tapered zone and the front perforated surface of the stranding die that defines a manifold, and the manifold is coordinately configured and dimensioned with a length and/or cross-sectional area of the channels in the plurality of non-uniform channels in the stranding die to increase flow rate of extrudate in a center of a cross-sectional profile of the extrudate relative to a periphery of the cross-sectional profile of the extrudate; and a molding die configured and dimensioned to connect to the stranding die, the molding die including:

a front orifice;
a rear orifice; and
a channel connecting the front orifice to the rear orifice, wherein a ratio of cross-sectional area of the front orifice to cross-sectional area of the rear orifice defines a compression ratio and the compression ratio is greater than about 1.5:1.

20. An apparatus comprising:
a source of extrudate flow;
a stranding die configured to receive extrudate from the source of extrudate flow, including:
a sloping, front perforated surface;
a rear perforated surface; and
a plurality of non-uniform channels extending from the front perforated surface to the rear perforated surface, wherein the source of extrudate flow is configured with respect to the stranding die to feed extrudate against the front perforated surface and through the plurality of non-uniform channels of the stranding die; and
an adapter die including:
a front orifice;
a rear orifice; and
a channel connecting the front orifice to the rear orifice, wherein the channel includes a restricted zone with a cross-sectional area less than a cross-sectional area of the rear orifice, wherein the plurality of non-uniform channels in the stranding die is dimensioned and configured to increase uniformity of extrudate flow relative to a stranding die having channels of equal length and cross-sectional area.

21. A process comprising extruding a cellulosic plastic composite extrudate with an apparatus, the apparatus comprising:
a source of extrudate flow;
a stranding die configured to receive the extrudate from the source of extrudate flow, including:
a sloping, front perforated surface;
a rear perforated surface; and
a plurality of non-uniform channels extending from the front perforated surface to the rear perforated surface, wherein the source of extrudate flow is configured with respect to the stranding die to feed the extrudate against the front perforated surface and through the plurality of non-uniform channels of the stranding die, and
an adapter die, wherein the adapter die includes:
a front orifice;
a rear orifice; and
a channel connecting the front orifice to the rear orifice, wherein the channel includes a restricted zone with a cross-sectional area less than a cross-sectional area of the rear orifice, wherein the plurality of non-uniform channels in the stranding die is dimensioned and configured to generate uniform flow of extrudate from the rear perforated surface of the stranding die.

22. A process comprising extruding a cellulosic plastic composite extrudate with an apparatus, the apparatus comprising:
a source of extrudate flow;
a stranding die configured to receive the extrudate from the source of extrudate flow, including:
a sloping, front perforated surface;
a rear perforated surface; and
a plurality of non-uniform channels extending from the front perforated surface to the rear perforated surface, wherein the source of extrudate flow is configured with respect to the stranding die to feed the extrudate against the front perforated surface and through the plurality of non-uniform channels of the stranding die, and
a molding die, wherein the molding die includes:
a front orifice;
a rear orifice; and
a channel connecting the front orifice to the rear orifice, wherein a ratio of cross-sectional area of the front orifice to cross-sectional area of the rear orifice defines a compression ratio and the compression ratio is greater than about 1.5:1.

23. A process comprising extruding a cellulosic plastic composite extrudate with an apparatus, the apparatus comprising:
a source of extrudate flow;
a stranding die configured to receive the extrudate from the source of extrudate flow, including:
a sloping, front perforated surface;
a rear perforated surface; and
a plurality of non-uniform channels extending from the front perforated surface to the rear perforated surface, wherein the source of extrudate flow is configured with respect to the stranding die to feed the extrudate against the front perforated surface and through the plurality of non-uniform channels of the stranding die;
a transition die, wherein the transition die includes:
a front orifice;
a rear orifice; and
a channel connecting the front orifice to the rear orifice and having an inner surface, wherein the channel includes a tapered zone that decreases in cross-sectional area from that of the front orifice to that of the rear orifice, the channel further includes a space between the inner surface of the tapered zone and the front perforated surface of the stranding die that defines a manifold, and the manifold is coordinately configured and dimensioned with a length and/or cross-sectional area of the channels in the plurality of non-uniform channels in the stranding die to increase flow rate of extrudate in a center of a cross-sectional profile of the extrudate relative to a periphery of the cross-sectional profile of the extrudate; and
a molding die, wherein the molding die includes:
a front orifice;
a rear orifice; and
a channel connecting the front orifice to the rear orifice, wherein a ratio of cross-sectional area of the front orifice to cross-sectional area of the rear orifice defines a compression ratio and the compression ratio is greater than about 1.5:1.

24. A process comprising extruding a cellulosic plastic composite extrudate with an apparatus, the apparatus comprising:
a source of extrudate flow;
a stranding die configured to receive the extrudate from the source of extrudate flow, including:
a sloping, front perforated surface;
a rear perforated surface; and
a plurality of non-uniform channels extending from the front perforated surface to the rear perforated surface, wherein the source of extrudate flow is configured with respect to the stranding die to feed the extrudate against the front perforated surface and through the plurality of non-uniform channels of the stranding die, and a transition die, wherein the transition die includes:
  a front orifice;
  a rear orifice; and
  a channel connecting the front orifice to the rear orifice and having an inner surface, wherein the channel includes a tapered zone that decreases in cross-sectional area from that of the front orifice to that of the rear orifice, the channel further includes a space between the inner surface of the tapered zone and the front perforated surface of the stranding die that defines a manifold, and the manifold is coordinately configured and dimensioned with a length and/or cross-sectional area of individual channels in the plurality of non-uniform channels in the stranding die to increase uniformity of extrudate flow relative to a stranding die having channels of equal length and cross-sectional area.

25. The process of claim 24 wherein a periphery of the plurality of non-uniform channels has channels with a greater cross-sectional area than channels in a center of the plurality of non-uniform channels.

26. The process of claim 24 wherein a center of the plurality of non-uniform channels has channels with a greater cross-sectional area than channels in a periphery of the plurality of non-uniform channels.

27. The process of claim 24 wherein the sloping, front perforated surface comprises variable slope.

28. The process of claim 24 wherein the apparatus further comprises a transition die, wherein the transition and stranding dies are configured such that a direction of flow of extrudate entering the transition die is at an angle relative to a direction of flow of extrudate entering the stranding die.

29. The process of claim 24 wherein the sloping, front perforated surface consists of a consistent slope.

30. The process of claim 24 wherein the plurality of non-uniform channels range in cross-sectional area from a narrowest channel to a widest channel by a factor of at least about 1.01.

31. The process of claim 24 wherein the stranding die is configured and dimensioned to adjust flow of extrudate therethrough and the plurality of non-uniform channels includes channels having differing lengths and/or differing cross-sectional area.

32. The apparatus of claim 24 wherein the plurality of non-uniform channels includes channels having centerlines with uniform distances between the centerlines.

33. The apparatus of claim 24 wherein the plurality of non-uniform channels includes channels having centerlines with varying distances between the centerlines.

34. The process of claim 24 wherein the transition and stranding dies are configured such that a direction of flow of extrudate entering the transition die is at an angle relative to a direction of flow of extrudate entering the stranding die.

35. The process of claim 24 wherein the apparatus further comprises a transition die, and wherein the transition and stranding dies are included in a straight extruder system and the tapered zone defines an annular taper.

36. The process of claim 24 wherein the apparatus further comprises an adapter die, wherein the adapter die includes:
  a front orifice;
  a rear orifice; and
  a channel connecting the front orifice to the rear orifice, wherein the channel includes a restricted zone.

37. The process of claim 24 wherein the plurality of non-uniform channels includes channels substantially circular in cross section and channels substantially non-circular in cross section, wherein the channels substantially non-circular in cross section interrupt a plane defined by rows of the channels substantially circular in cross section.

38. A process comprising extruding a cellulosic plastic composite extrudate with an apparatus, the apparatus comprising:
  a source of extrudate flow; and
  a stranding die configured to receive the extrudate from the source of extrudate flow, including:
    a sloping, front perforated surface;
    a rear perforated surface; and
    a plurality of non-uniform channels extending from the front perforated surface to the rear perforated surface,
    wherein the source of extrudate flow is configured with respect to the stranding die to feed the extrudate against the front perforated surface and through the plurality of non-uniform channels of the stranding die, and wherein the variable slope defines a concave perforated surface on the front perforated surface of the stranding die with a center portion of the concave perforated surface retracting away from the source of extrudate flow further than a periphery portion of the concave perforated surface.

39. The process of claim 38 wherein the plurality of non-uniform channels range in length from a smallest length to a greatest length by a factor of at least about 1.01.

40. A process comprising extruding a cellulosic plastic composite extrudate with an apparatus, the apparatus comprising:
  a source of extrudate flow; and
  a stranding die configured to receive the extrudate from the source of extrudate flow, including:
    a sloping, front perforated surface;
    a rear perforated surface; and
    a plurality of non-uniform channels extending from the front perforated surface to the rear perforated surface,
    wherein the source of extrudate flow is configured with respect to the stranding die to feed the extrudate against the front perforated surface and through the plurality of non-uniform channels of the stranding die, and wherein the variable slope defines a convex perforated surface on the front perforated surface with a center portion of the convex perforated surface extending toward the source of extrudate flow further than a periphery portion of the convex perforated surface.

41. The process of claim 40 wherein the plurality of non-uniform channels range in length from a smallest length to a greatest length by a factor of at least about 1.01.

42. An apparatus comprising:
  a source of extrudate flow; and
  a stranding die configured to receive extrudate from the source of extrudate flow, including:
    a sloping, front perforated surface;
    a rear perforated surface; and
    a plurality of non-uniform channels extending from the front perforated surface to the rear perforated surface,
    wherein the source of extrudate flow is configured with respect to the stranding die to feed extrudate against the front perforated surface and through the plurality of non-uniform channels of the stranding die, wherein the sloping, front perforated surface comprises variable slope, and wherein the variable slope defines a convex perforated surface on the front perforated surface of the stranding die with a center portion of the convex perforated surface extending toward the source of extrudate flow further than a periphery portion of the convex perforated surface.

43. The apparatus of claim 42 wherein the plurality of non-uniform channels range in length from a smallest length to a greatest length by a factor of at least about 1.01.

44. An apparatus comprising:
- a source of extrudate flow; and
- a stranding die configured to receive extrudate from the source of extrudate flow, including:
  - a sloping, front perforated surface;
  - a rear perforated surface; and
  - a plurality of non-uniform channels extending from the front perforated surface to the rear perforated surface,
  - wherein the source of extrudate flow is configured with respect to the stranding die to feed extrudate against the front perforated surface and through the plurality of non-uniform channels of the stranding die, wherein the sloping, front perforated surface comprises variable slope, and wherein the variable slope defines a concave perforated surface on the front perforated surface of the stranding die with a center portion of the concave perforated surface retracting away from the source of extrudate flow further than a periphery portion of the concave perforated surface.

45. The apparatus of claim 44 wherein a center of the plurality of non-uniform channels has channels with a greater cross-sectional area than channels in a periphery of the plurality of non-uniform channels.

46. The apparatus of claim 44 wherein the plurality of non-uniform channels range in length from a smallest length to a greatest length by a factor of at least about 1.01.

47. The apparatus of claim 1 wherein the plurality of non-uniform channels includes channels substantially circular in cross section and channels substantially non-circular in cross section, wherein the channels substantially non-circular in cross section interrupt a plane defined by rows of the channels substantially circular in cross section.

* * * * *